United States Patent [19]

Smith et al.

[11] 4,044,841

[45] Aug. 30, 1977

[54] ROTARY TILLER DEVICE ADAPTED FOR CHOPPING

[75] Inventors: Alexander Smith; Burton D. Baggs, Jr., both of Sanford, Fla.

[73] Assignee: Smitty's Incorporated, Sanford, Fla.

[21] Appl. No.: 591,098

[22] Filed: June 27, 1975

Related U.S. Application Data

[63] Continuation-in-part of Ser. No. 319,039, Dec. 27, 1972, Pat. No. 3,892,278.

[51] Int. Cl.$^2$ .................. A01B 33/02; A01B 33/12
[52] U.S. Cl. ................... 172/72; 172/68; 172/112; 172/119; 172/121; 172/122; 172/552
[58] Field of Search .............. 172/63, 68, 70, 72, 172/112, 118, 119, 121, 122, 540, 552

[56] References Cited

U.S. PATENT DOCUMENTS

| | | | |
|---|---|---|---|
| 100,183 | 2/1870 | Nusbaum | 172/119 X |
| 356,284 | 1/1887 | La Shells | 172/119 X |
| 907,173 | 12/1908 | Priddy | 172/121 X |
| 1,662,088 | 3/1928 | Von Raussendorff | 172/112 X |
| 1,885,231 | 11/1932 | Chong et al. | 172/540 X |
| 3,181,619 | 5/1965 | Smith et al. | 172/123 X |
| 3,220,486 | 11/1965 | Smith et al. | 172/119 |
| 3,746,101 | 7/1973 | Takata | 172/123 X |

FOREIGN PATENT DOCUMENTS

| | | | |
|---|---|---|---|
| 89,998 | 3/1958 | Denmark | 172/119 |
| 99,444 | 10/1961 | Netherlands | 172/121 |
| 6,514,841 | 5/1967 | Netherlands | 172/112 |
| 372,765 | 5/1932 | United Kingdom | 172/119 |
| 769,309 | 3/1957 | United Kingdom | 172/552 |

*Primary Examiner*—Paul E. Shapiro
*Attorney, Agent, or Firm*—Julian C. Renfro

[57] ABSTRACT

A device in the nature of a rotary tiller equipped for traveling through fields as well as uneven terrain, for effectively chopping up encountered clods, vegetation and debris, and mixing same with the soil. We utilize a framework in which either of two different types of bladed, couner-rotating rotors may be effectively mounted, with one type of rotor having a number of outwardly extending teeth that are adapted for penetrating the ground as the tiller device moves thereover. The outermost portion of each tooth is provided with a novel cutting blade, which may interact with a stationary shear bar, with this type of blade being well adapted for chopping up encountered vegetation and for mixing it thoroughly with the soil. Another type of blade usable in our rotary tiller is a cylindrially-shaped gumbo rotor, utilizing a number of essentially flat, peripherally disposed blades, each of substantially rectangular configuration, which blades are oriented such that their principal surfaces each form a part of the exterior of the cylinder, and with each blade having a long edge that is sharpened, and caused to engage the soil. This latter type of rotor advantageously will not clog or become ineffective, even in very sticky soil. Our tiller device is equipped for mounting either type of rotor in such a manner that the depth of cut can be carefully controlled, and such that the closeness of the toothed blade to the shear bar can be carefully controlled. We preferably utilize a spring bias arrangement in the fore and aft positioning of the rotor, such that upon a hard obstacle becoming lodged between the shear bar and the rotor teeth, the spring bias can be overcome in such a way as to cause an enlargement of the distance between the teeth and the shear bar, such that the obstruction can pass through. Other features of our invention include the use of at least one skirt on the rear of the device for assuring a highly satisfactory leveling action.

32 Claims, 25 Drawing Figures

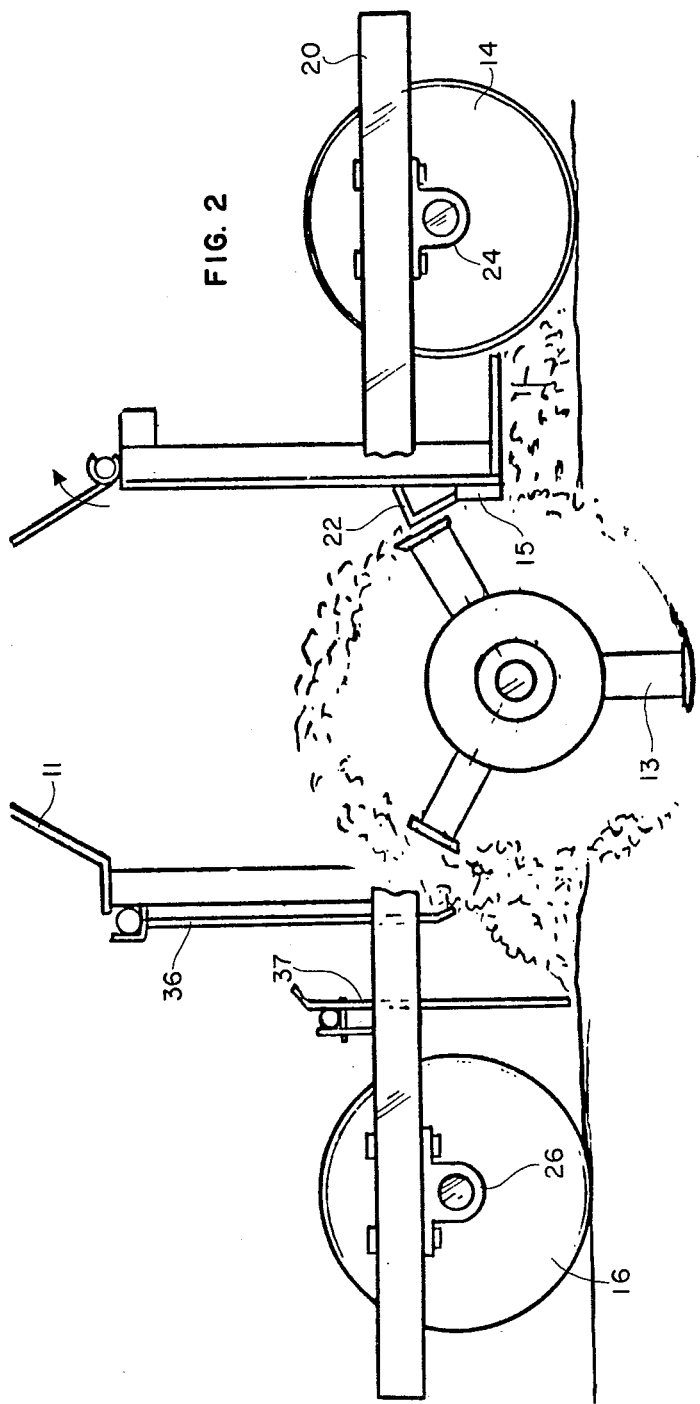
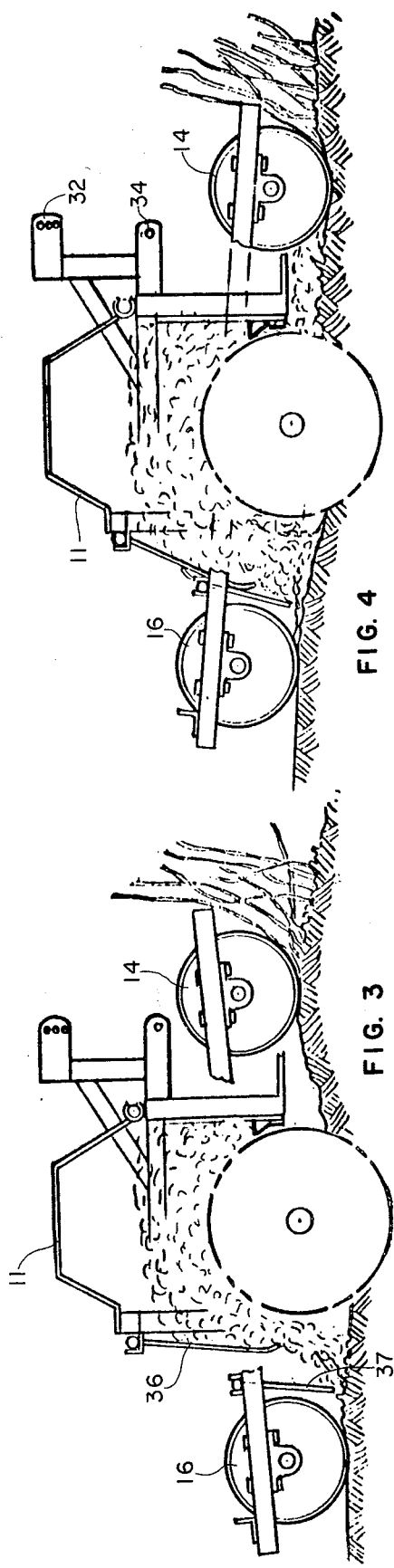

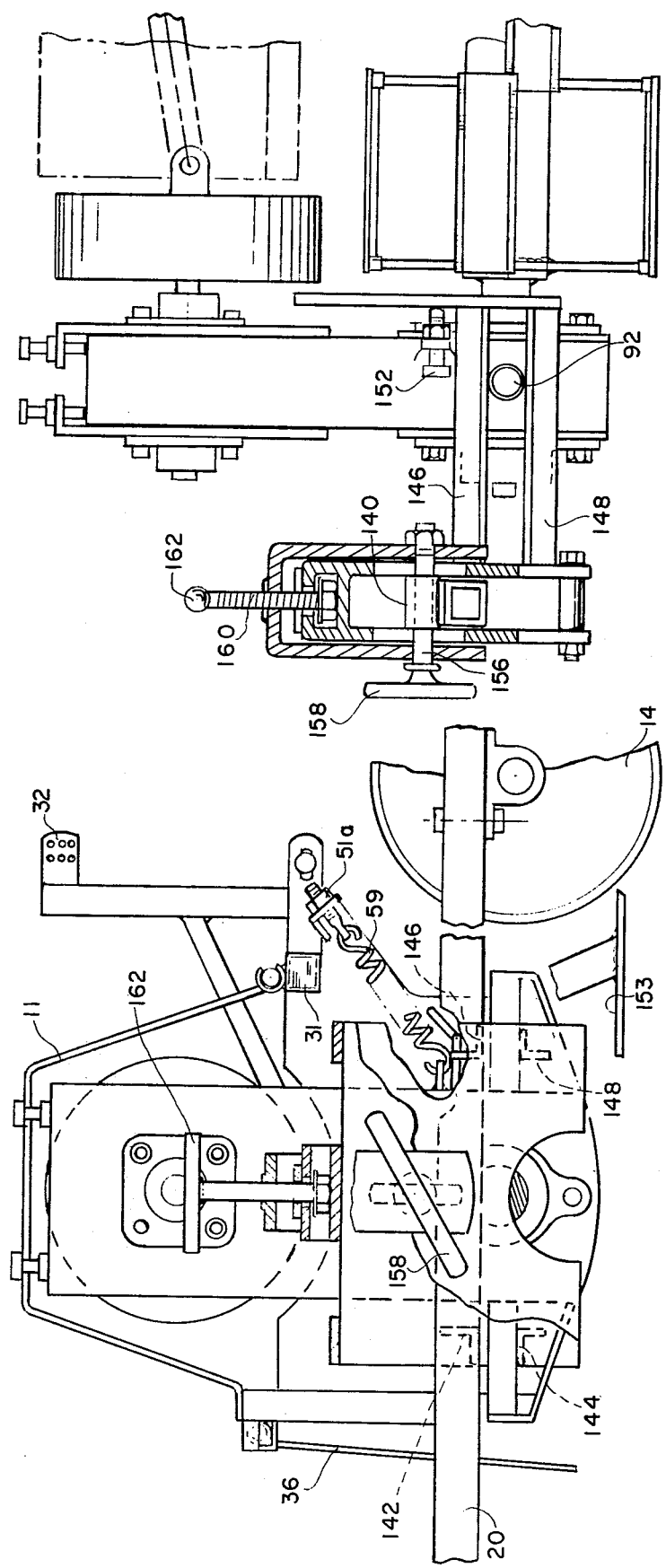

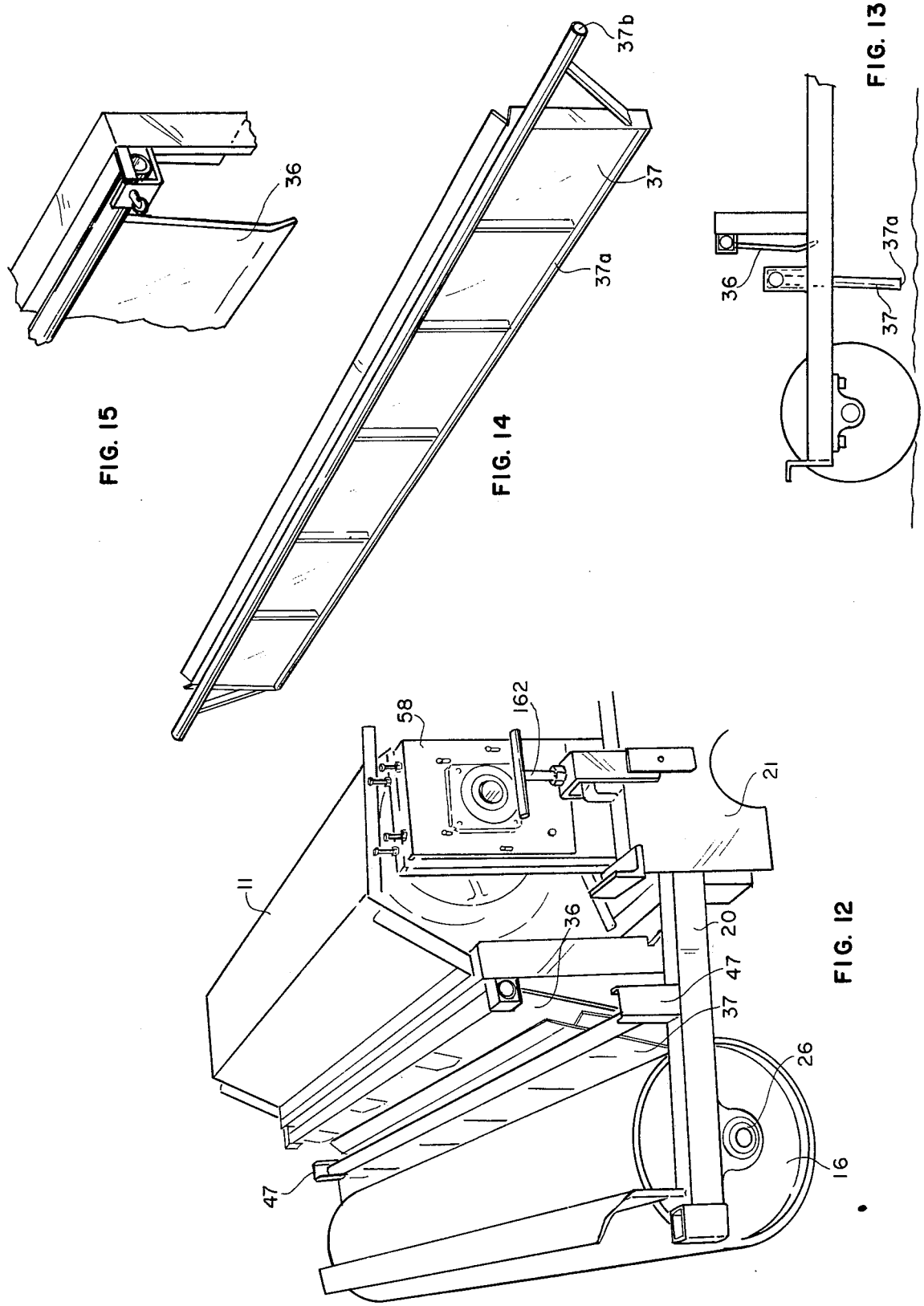

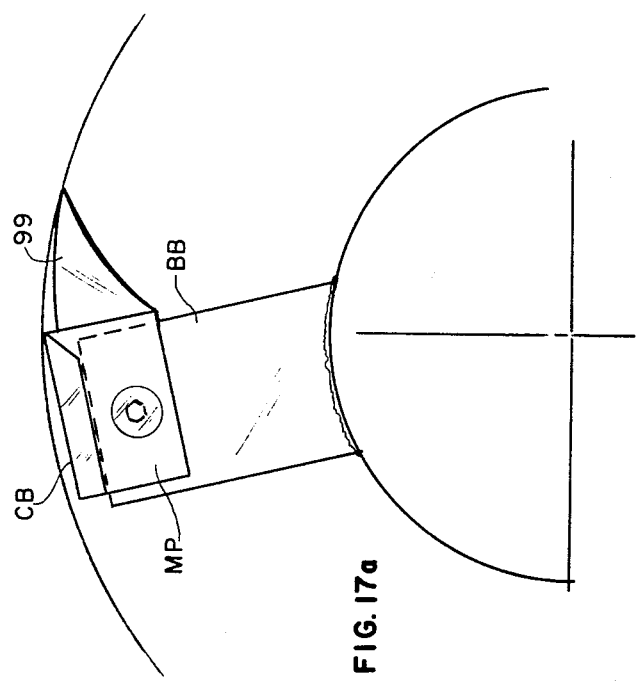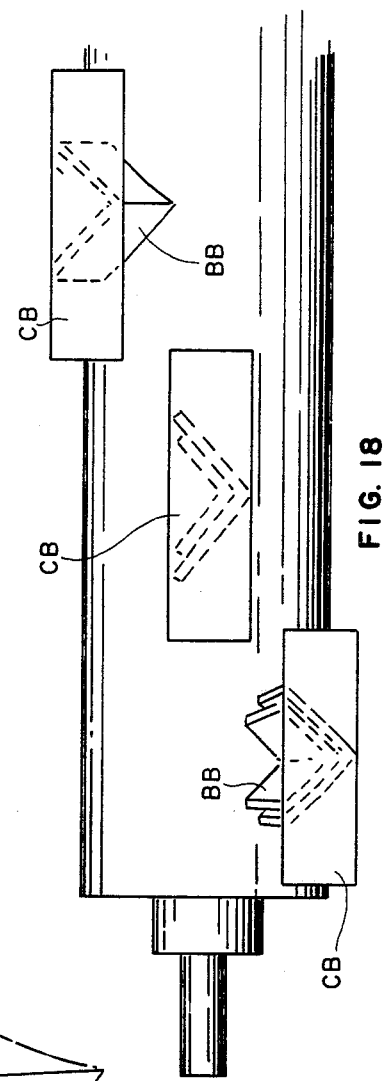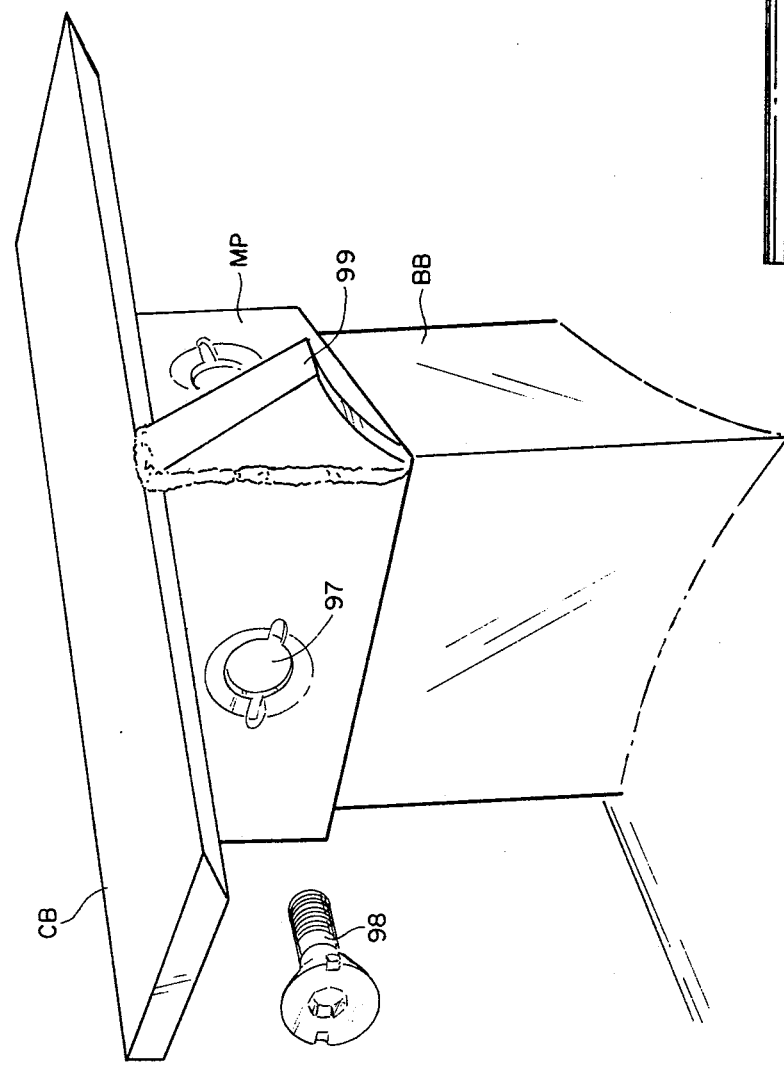

ROTARY TILLER DEVICE ADAPTED FOR CHOPPING

RELATIONSHIP TO PREVIOUS INVENTIONS

This invention is generally relatable to those cultivator and tiller inventions represented by certain of our previous U.S. Pats., such as U.S. Pat. Nos. 3,181,619 and 3,220,486. It is a Continuation-in-Part of our copending U.S. Pat. Application entitled "Rotary Tiller - Mulcher," Ser. No. 319,039 filed Dec. 27, 1972, now U.S. Pat. No. 3,892,278, issued July 1, 1975.

BACKGROUND OF THIS INVENTION

The need for effective means for tilling land has led to a number of power driven rotary tiller configurations, such as those mentioned above, in which a counter rotating rotor was provided for bringing about a heavy mulching action. In that way it was possible to replant a field shortly after the harvesting of the previous crop, by running the rotary tiller over the entire field once. Because of the use of a number of ground-engaging blades or teeth, it was possible to break up encountered clods and vegetation, and achieve a desirable amount of mulching action.

Purchasers of our machines utilized them in a various number of soils and operating conditions, and found that our earlier machines were highly satisfactory in some soil conditions, and less satisfactory in others.

In our above-identified copending patent application, we described the utilization of a toothed rotor interacting with a stationary shear bar, with the rapid rotation of the rotor in the direction opposite the travel of the tiller bringing about a vigorous tilling action as well as the creation of a fluidized soil mass in the upper part of the tiller housing. This brought about a very thorough mixing action, with the resulting mixture being deposited on the ground behind the rotor as it passed along.

Although this action was highly satisfactory in some soils, because sticky soil tended to cling to the interior of the housing, a considerable amount of horsepower was required in the instance in which fields were being worked which contained gumbo or other types of sticky soil. Unfortunately, the volume of the housing of some of our previous machines proved ineffectually small for certain sticky soil conditions, and it was partially in rectification of this earlier construction deficiency that the present design was evolved.

Summary of this Invention

In accordance with this invention, we have provided a rotary tiller device in which a bladed counter-rotating rotor is utilized for intercepting the soil and bringing about a vigorous tilling and mulching function. However, in accordance with this invention, we have provided a much larger housing in which the bladed rotor can operate, thereby providing more volume in which a mixing action of the earth with roots, stalks and other such items can take place. As a result of this construction, it is possible for a much more extensive mixing action to take place, while at the same time minimizing horsepower requirements and minimizing the possibility of the rotor becoming clogged.

The bladed rotor we use for accomplishing the tilling and mulching function is adjustable with respect to the framework of the device in two principal directions. First of all, the vertical relationship between the rotor and the framework can be easily and accurately set by the operator, so that the distance the blades extend below the framework and into the soil can be carefully established. Secondly, the position that the rotor occupies in the framework in a fore and aft sense can also be set, which is of particular importance in the event a shear bar is provided to interact with the blades of the rotor. We preferably utilize a spring bias for holding the rotor in the desired, spaced relationship with the shear bar, but should an obstruction be encountered between the blades and the shear bar, the rotor is caused to drop back, causing an elongation of the springs and enlargement of the space between the blades and the shear bar, so that the obstruction can pass through.

The rotor is supported at each end by a respective drive chain housing, that enables power to be applied in a direction bringing about a counter-rotation of the rotor with respect to the direction of travel. The mounting arrangement of the chain boxes with respect to the framework of our device is such as to enable certain relative movements to take place, such as the dropping back of the rotor with respect to the shear bar when an obstruction is encountered. Another example is presented in the instance in which the rotor blades are operating at a considerable soil depth, which in turn may cause a degree of bowing to take place in the central portion of the rotor. As a consequence, some deflection of the shaft at each end of the rotor is caused to take place, and in such instance, the chain boxes can move so as to avoid unnecessary deflection of the shaft ends, which would of course lead to a greatly shortened work life.

Because the chain boxes are mounted independently of each other, it is possible if a single obstruction is encountered by the rotor near one of the chain boxes, for that chain box to drop back and thus locally enlarge the distance between the rotor and the shear bar, thus to allow the obstruction to pass through. In this instance, the rotor to some extent pivots about the other chain box, which can move to accommodate this action without any breakage or overstressing of any component being involved, and with power being able to be continuously supplied to the rotor.

In order to most effectively cause the fluidized mixture of soil and vegetation to be deposited evenly behind the rotor, we also provide in accordance with this invention a novel skirt arrangement, involving an upper skirt and a lower skirt, with the lower edge of the lower skirt passing in contact with the ground, to bring about a leveling action. Because of the type of skirt suspension used, the skirt positions can change in accordance with the amount of soil being mixed and pulverized, thus enabling a most effective mixing to be obtained at all times. In this way, we not only achieve the thorough mixing action, but by virtue of the skirt arrangement, a very thorough and effective leveling action as well.

Whereas the toothed rotor is highly effective in sandy soil, and accomplishes excellent chopping and mixing, we have provided in accordance with this invention a gumbo blade that is more effective in sticky soils inasmuch as the clogging of the gumbo blade by sticky soils is almost an impossibility. This blade does not achieve the thorough mixing the toothed rotor does, but it will allow the user to quickly convert his field of sticky soil into condition for planting with a minimum of horsepower and fuel outlay being required.

It is therefore a principal object of our machine to provide a rotary tiller machine highly effective for tilling, chopping and leveling operations.

It is another object of our invention to provide a rotary tiller having an enlarged housing such that extensive mixing of soil with encountered vegetation can be accomplished without horsepower penalty.

It is yet another object of our invention to provide a rotary tiller type device in which a spring bias is used for rotor mounting, such that in the event a hard object is encountered, the rotor can move within the housing so as to allow such objects to pass through without causing damage.

It is still another object of our invention to provide a rotary tiller type device in which the user can select the blade or rotor needed for a given operation, thus enabling him to be able to pick one type of rotor for sandy soil and another type of rotor for gumbo soil.

It is yet another object of our invention to provide a rotary tiller type device in which the user can make appropriate adjustments in the field so as to cause the rotor-shear bar relationship to be the most effective for a given condition.

It is another object of our invention to provide novel blade configurations for the rotor of a rotary tiller.

These and other objects, features and advantages will be more apparent from the appended drawings.

BRIEF DESCRIPTION OF DRAWINGS

FIG. 2 is a simplified side elevational view of our rotary tiller, illustrating the counter-rotating rotor interacting with the shear bar and novel earth deflector, with this view also revealing the considerable space that exists between the rotor and the upper portion of the housing;

FIG. 3 is a similar view but to smaller scale, illustrating a diminishment of earth being handled by the rotor as the depth of cut decreases;

FIG. 4 is also a similar view, but showing an increased amount of intercepted earth and also showing the rearward movement of the upper and lower skirts utilized at the rear of our device as a result of the increased flow;

FIG. 7a is a fragmentary view to a larger scale, revealing the type of chain utilized in each of the chain boxes;

FIG. 7b is a fragmentary view to a larger scale, of the bearing and seal arrangement we prefer;

FIG. 10 is a somewhat different type of end view than FIG. 9, revealing the chain housing and spring bias, as well as the rotor depth adjustment mechanism;

FIG. 11 is a fragmentary view revealing other details of the height adjusting arrangement, as well as revealing a portion of a different type of rotor usable in accordance with this invention;

FIG. 12 is a fragmentary perspective view taken of a rear corner of our device, revealing the location of the novel skirts we use in accordance with this invention;

FIG. 13 is a simplified view to a smaller scale to reveal the support of the upper skirt from the basic framework of our device, and the support of the lower skirt from the cross axle;

FIG. 14 is a perspective view of the lower skirt when removed from the machine;

FIG. 15 is a fragmentary view revealing other details of the skirt suspension arrangement, this involving the upper skirt;

FIG. 16 is a perspective view of the mixing and chopping type toothed rotor we utilize, in which the tooth units are mounted in a helical arrangement on the rotor drum, with the outer portions of these blades serving to interact with the shear bar of the framework to accomplish the chopping function;

FIG. 17 is an enlarged view of a typical blade base, atop which is a typical chopping blade, with this particular blade unit having a protrusion or nose member utilized for breaking hard soil;

FIG. 17a is a cross sectional view through the rotor to reveal the preferred angular mounting of the blade base, and the relationship of the cutting blade and the nose member to the largest circle described by this rotor;

FIG. 18 is a plan view of one end of a typical toothed rotor, showing a preferred arrangement of blade units as well as the use of cutting blade portions that overlap slightly;

DETAILED DESCRIPTION

Figure 1:
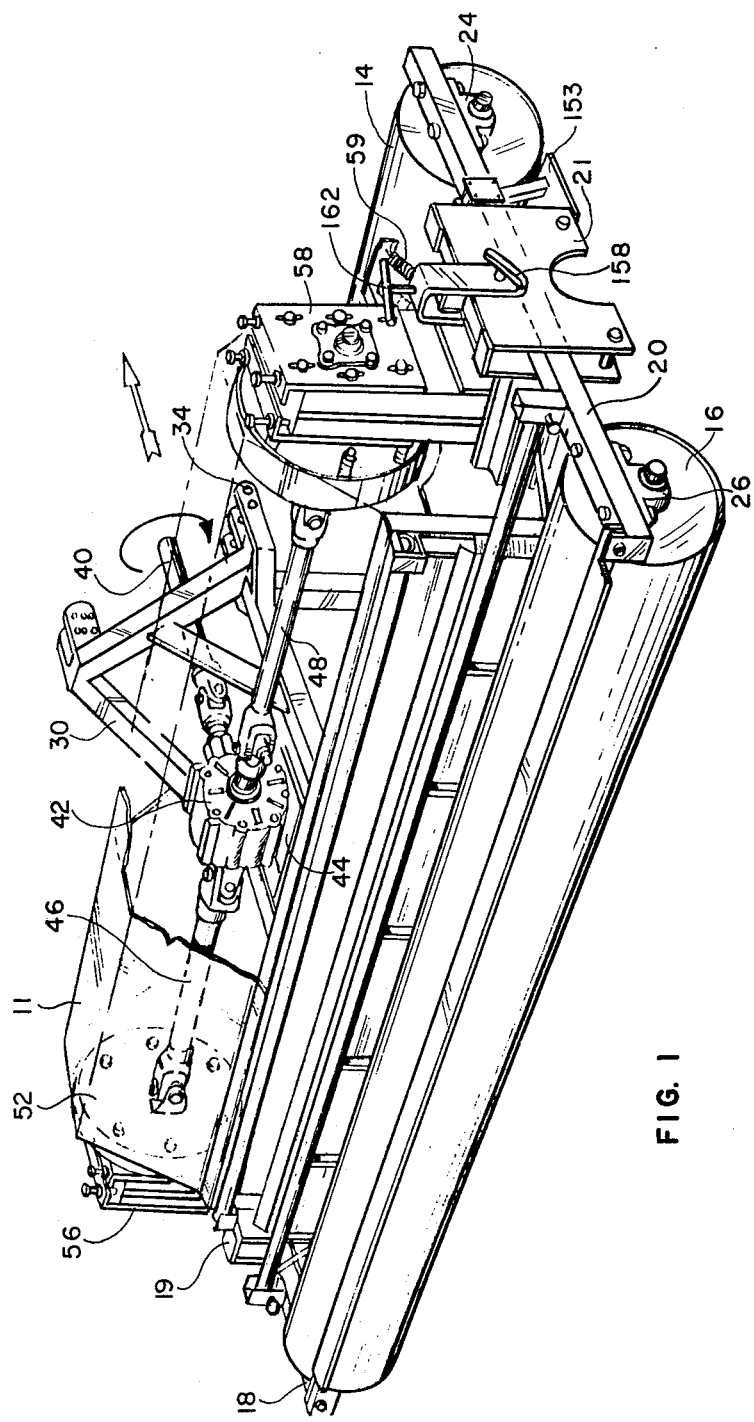
FIG. 1 is a perspective view of a typical rotary tiller device in accordance with this invention, with this device utilizing an enlarged housing above the rotor, a portion of which housing is removed in this instance in order to reveal internal construction.

Turning to FIG. 1, it will there be seen that we have illustrated a mulching type tiller 10 of the type to be drawn through a field or farm by a tractor or other appropriate vehicle (not shown). Hingedly mounted housing cover 11 extends the full left-right width of our device, with the framework 12 that defines the housing being supported by a forward roller 14 and a rear roller 16. The rollers are maintained in the spaced relationship shown in FIG. 1 as well as in FIGS. 2 through 4 as the tiller moves over the ground by virtue of the fact that we use left and right cross axles 18 and 20 at essentially opposite ends of the housing, with suitable bearings 24 and 26 being provided on the underside of the cross axles, in which are received the stub shafts located at each end of each roller. Although the rollers 14 and 16 support the weight of the framework 12 and the components carried thereby, the rollers are in a type of floating relationship with respect to the housing so as to take into consideration uneven ground situations, this being made possible by virtue of the fact that the cross axles 18 and 20 are movable to a limited degree in adapter plates 19 and 21, respectively. This arrangement will be discussed at length hereinafter, as will our novel tiller rotor 13.

The tractor or other vehicle utilized for pulling our mulching type tiller through a field or the like is attached by means of a three point hitch assembly 30, as is to be seen in FIG. 1 as well as in FIGS. 3 and 4. The hitch assembly 30 has an upper connection point 32 as well as a pair of lower connection points 34, with these components being affixed to principal frame member 31; see FIG. 5. The connection points 34 are spaced approximately as far apart as they each are spaced from upper point 32. As a result of this more or less conventional hitch arrangement, the framework 12 maintains approximately verticality at all times, although if the pulling vehicle starts up a grade or down a grade, the frame 12 will move away from the vertical to some extent.

Turning to FIG. 2, it will there be seen that we have depicted the preferred form of bladed rotor, a toothed rotor 13 designed to be driven in rotation in the direction opposite to the rolling direction of the forward roller 14 and the rear roller 16. The rotor 13 has an axial length substantially equal to that of the forward and rear rollers, and is provided with a comparatively large number of teeth around its periphery, designed to intercept the ground and accomplish a thorough tilling thereof. Although we are not to be limited to the use of a shear bar in all instances, we nevertheless prefer the use of a shear bar 15 mounted forward of the rotor, and slightly above the centerline thereof, with which the outer, cutting portion of the rotor teeth interact, thus to accomplish a cutting of roots, clods and the like, as are often to be found in fields.

FIGS. 3 and 4 illustrate the relationships as the rollers 14 and 16 move over an irregularity or change of grade or elevation, and it is to be noted that although the cross axle 20 tilts to a considerable extent, the framework 12 does not move appreciably away from the essentially vertical position shown in each figure on such occasions. The arrangement making this possible, as well as the novel skirt arrangement involving the upper and lower hingedly mounted skirts 36 and 37, will be discussed hereinafter at some length.

It will be noted that we have endeavored to use, insofar as such is appropriate, the same reference numerals as appear on like items in our copending application, Ser. No. 319,039, which is to issue on July 1, 1975 as U.S. Pat. No. 3,892,278.

Returning to FIG. 1, the arrangement for supplying power to bring about the rotation of the rotor 13 is seen to include a rotary shaft 40 driven in rotation from the power take-off of the tractor, and a gearbox 42, supported above a central portion of the framework 12 by a frame 44. The gearbox is arranged to receive the power supplied by the shaft 40, and then redirect it along the lateral shafts 46 and 48. It will be noted that a universal joint is provided adjacent the input and each output locations of the gearbox to allow for relative movement. The outboard end of shaft 46 is connected through a universal joint to a friction type torque limiter 52, and the outboard end of shaft 48 is connected through a universal joint to a friction type torque limiter 54. Power transmitted through these torque limiters is utilized for turning drive chains disposed in chain housings 56 and 58, respectively, which chains are responsible for causing the tiller rotor 13 to rotate. The preferred direction of rotation for the tiller rotor is counter to the direction of travel of the housing over the ground, as indicated previously, and the interior of the framework 12 is configured in a manner appropriate for the rotation therein of the tiller rotor. The housing cover 11 is large, and extends upward for a considerable extent, thus defining a large volume in which the earth can be contained as it is being mixed by the rotor 13. We will hereinafter refer to the volume above the rotor and inside the cover as being the mixing chamber 43.

Since the rotor 13 may operate at a rotative speed of several hundred revolutions per minute, a substantial amount of earth will be churned up into an almost fluid mixture in the chamber 43. The intercepted earth flows above the counter-rotating rotor in the general manner shown in FIGS. 2-4, and is thereafter smoothed by the lower skirt 37, as will be discussed hereinafter. By the proper positioning of the lower skirt member, holes and irregularities in the field will tend, in accordance with this invention, to be filled very effectively.

Figure 5:
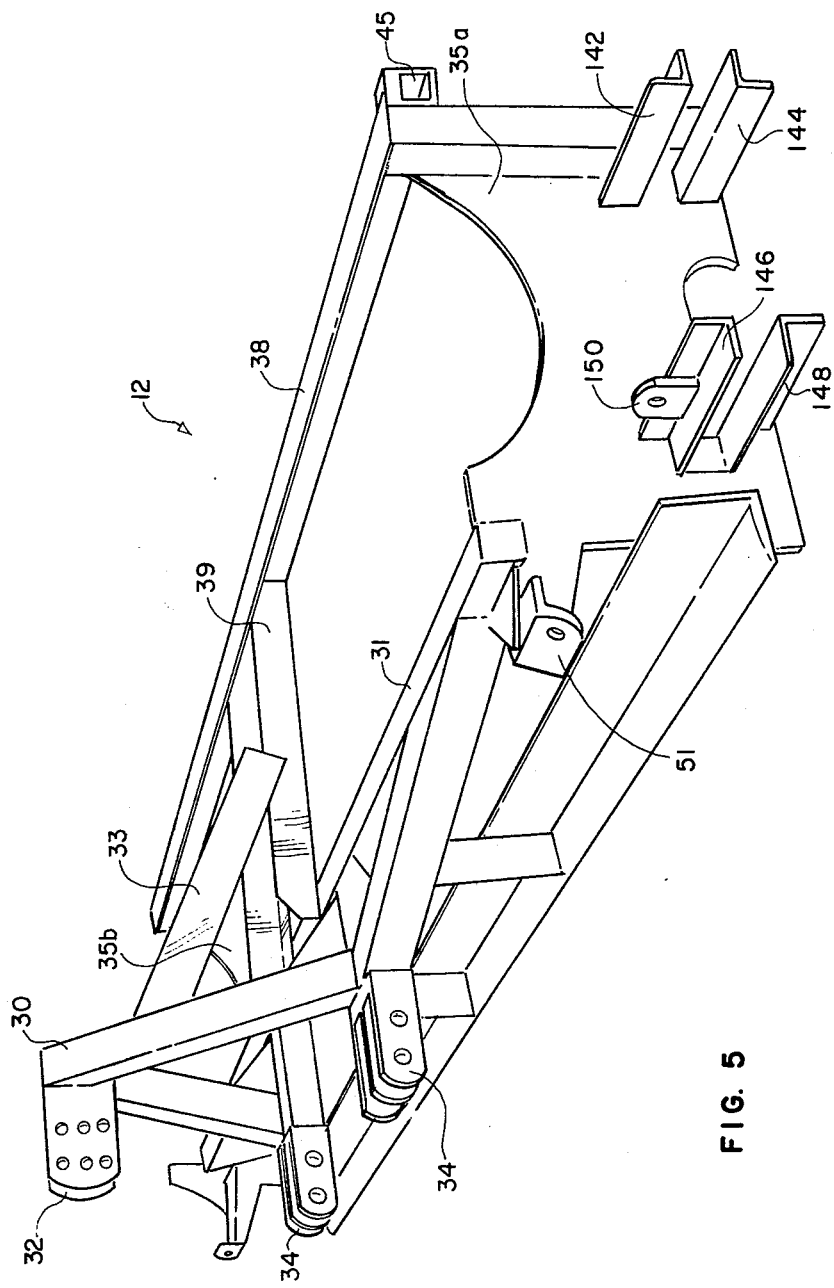
FIG. 5 is a perspective view of the framework portion of our rotary tiller device, with movable portions removed.

Turning now to FIG. 5, it is to be seen that we have there illustrated the basic framework 12 with all movable components removed therefrom. The towbar arrangement 30 is revealed by this figure to involve the aforementioned upper connection 32 and the lower connections 34, with all of these being in turn connected to principal frame number 31, which is a rugged structural member extending virtually the entire length of the framework in the left-right direction.

Affixed at the ends of the principal frame number 31, such as by welding, are vertically-disposed heavy steel plates 35a and 35b, whose upper and lower surfaces are contoured. These end plates are the principal means for holding the front and rear portions of the framework together. Furthermore, it is to be noted that the plate 35a serves as the mounting means for horizontally disposed, outwardly extending structural members 142 and 144, which are spaced apart to receive a stub shaft 90, as well as structural members 146 and 148, which are spaced apart to receive a stub shaft 92. Shafts 90 and 92 do not appear in this figure, but they are to be understood to form the support for the left hand chain housing 56, the lower rear portion of which is adjacent the members 142 and 144, and the lower forward portion of which is adjacent the members 146 and 148.

Figure 8:
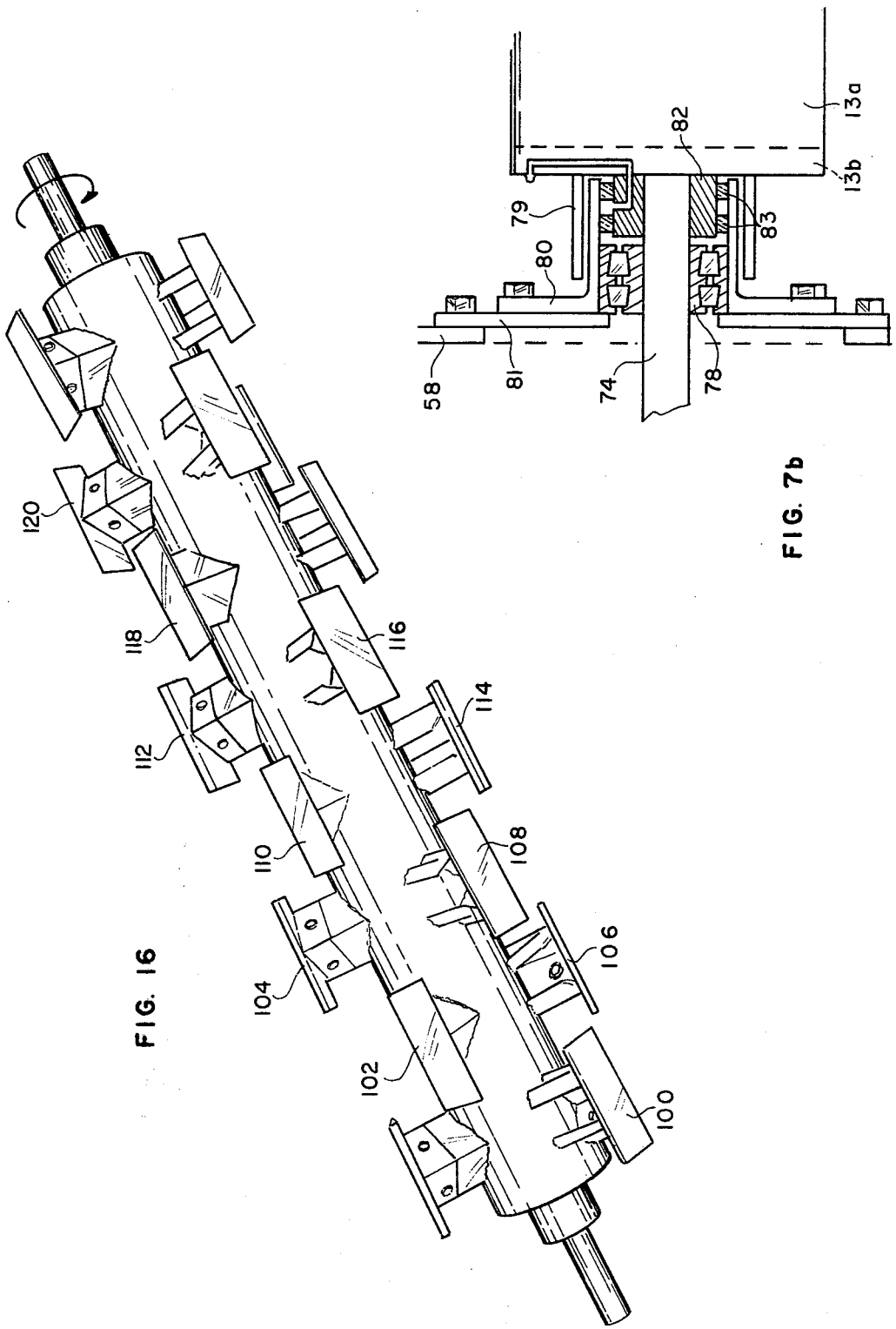
FIG. 8 is an end view of the adjacent chain housing of FIG. 7, with the instant figure revealing the stub shafts by which each chain housing is movably supported.

It is also to be understood that plate 35b, whose exterior portion is not shown in FIG. 5, likewise has mounted thereon, rear structural members 142 and 144, and front structural members 146 and 148, that are comparable to those shown in FIG. 5. FIG. 8 reveals the manner in which these members form the support for stub shafts 90 and 92 of the right hand chain housing 58.

Serving in addition to the plates 35a and 35b in holding the upper rear member 38 at a constant distance from the principal frame member 31 are the mid-structural frame member 39, one of which is disposed on either side of the frame 44 that is used to support the gearbox 42. A brace 33 extends between each member 39, and a near-vertical portion of the tow bar assembly. A support member 45 is attached at each end of the upper rear member 38, to enable the attachment of the upper skirt member 36, as discussed hereinafter.

Figure 6:
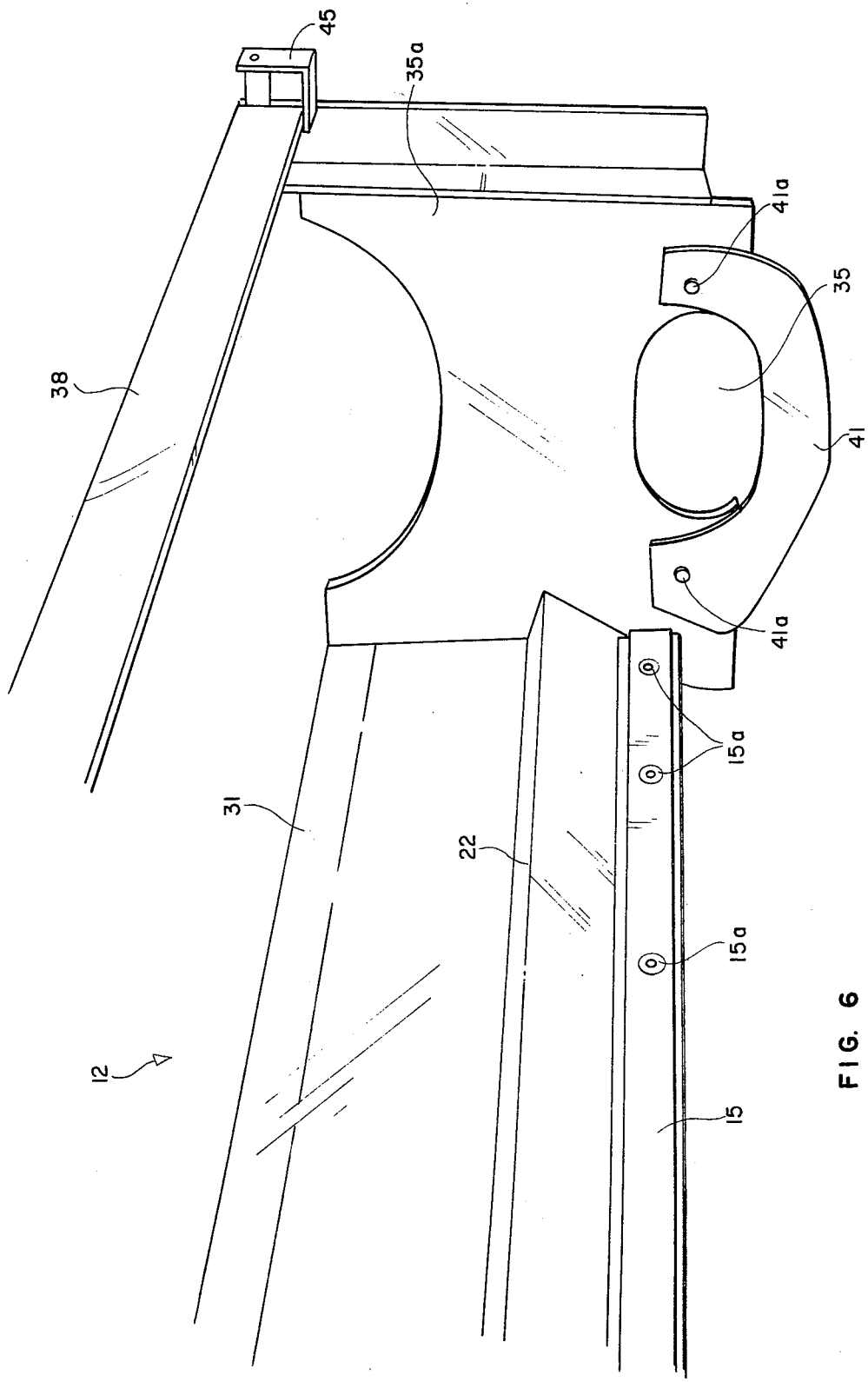
FIG. 6 is an interior view of the framework, revealing the shear bar and deflector plate, as well as the oblong opening through which an end of the rotor extends.

Turning to FIG. 6, it will be seen from this interior view of the framework 12 that the shear bar 15 is located in a comparatively low portion of the inner forward side of the framework 12. The shear bar is held in place by numerous bolts 15a, and is substantially coextensive with the rotor (not shown in this figure), with the right hand end of the shear bar 15 terminating adjacent the inner surface of the vertical end plate 35b, and with the left hand end terminating adjacent the inner end of plate 35a, not shown in FIG. 6. Disposed immediately above the shear bar in accordance with this invention, is the flow redirecting member 22, or deflector which is responsible for causing the fluidized earth mixture to flow rearwardly as well as upwardly, rather than just upwardly from the rotor, as very well would have otherwise been the case.

The deflector 22 extends the full length of the rotor in a left-right sense, and serves the very important function of providing a rearward trajectory to the earth intercepted by the rotor blades, thereby effectively preventing a build-up of earth in the forward portion of the interior of the housing. Significantly, this redirecting of earth is accomplished with a minimum of friction, for the deflector extends closely adjacent the rotor blades for only approximately 4 inches. Because the deflector 22 brings about a highly effective rearward movement of earth over the top of the rotor, mixing in the mixing chamber 43 is enhanced, whereas useless churning of the earth, as would have occurred had a build-up of earth in the front of the mixing chamber been allowed to form, would have caused a substantial drag on the rotor and thus represented a large horsepower penalty.

The bottom edge of the shear bar 15 is approximately 1 inch above the centerline of the rotor 13, and the principal portion of the deflector 22, located just above the shear bar, is disposed, as viewed in FIG. 2, at approximately a 45° angle. When the blade tips of the rotor are set to a ¼ inch spacing with the shear bar 15, the blade tips come within ½ inch to ¾ inch from the diagonal portion of the active surface of the deflector 22. Because the four inch dimension of the diagonal portion of the deflector is necessarily associated with rapidly moving earth, there is virtually no chance whatever of earth sticking to the director, and only a very small power penalty is involved.

It should be noted in FIG. 6 that the bottom portion of plate 35b has an oval cutout 35. Extending in a curved manner below each cutout 35 is a somewhat U-shaped wear plate 41, with the upper surface of this plate of course completing the oval configuration in which the rotor axle is disposed. The wear plate is located on the interior rather than the exterior of the end wall of the housing, and serves in the event of wrappage of vines or the like about the rotor axle, to prevent undue wear on the inside of the housing. Perhaps even more importantly, the use of the wear plate on each end of the device serves to prevent the packing of earth between each chain housing and its respective end plate, 35a or 35b. We found from the time of first using the wear plates 41, that breakage of rotor shafts due to the hard packing of earth between the chain housings and their respective end plates had been entirely eliminated.

We typically secure each wear plate 41 in the desired position utilizing a pair of bolts 41a whose heads are flat and disposed toward the rotor, with the nuts (not shown) being disposed on the far side of the plates 35a and 35b. Also visible in this figure is one of the pair of brackets 45 for supporting the upper skirt 36.

Figure 7:
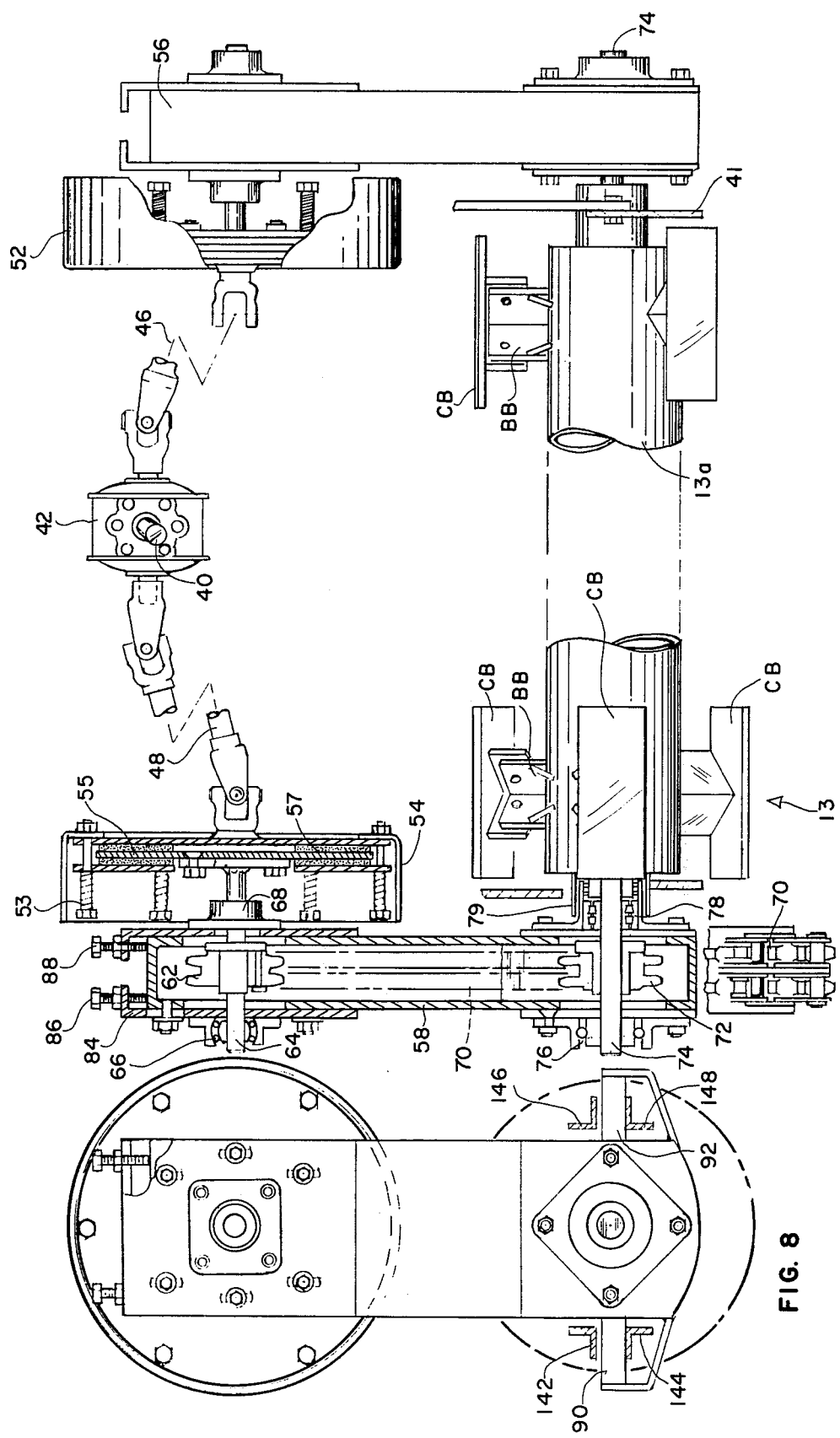
FIG. 7 is a foreshortened view of the rotor in order that both chain boxes can be shown, with one of these chain boxes being cut away in order to reveal internal construction.

Turning to FIG. 7, it is there to be seen that we have depicted a preferred arrangement for supplying power from the gear box 42, to bring about the driving of the rotor 13 in a contrarotating direction as our rotary tiller is pulled across a field. In this instance, we have illustrated the bladed rotor 13 as moving toward the viewer, or in other words, moving out of the plane of the paper, with the blade units on the underside of the illustrated rotor being in an advancing relationship, and the blade units on the upper surface being in a retreating relationship. We refer to the illustrated type of rotor as being of the toothed type, which is in contrast to the gumbo type blade illustrated and described hereinafter.

A number of blade holders or blade bases BB are disposed at spaced locations along the exterior of the rotor drum 13a, with elongate cutting blades CB, having sharpened leading edges, being supported by the blade bases, and thus forming the radially outer portion of each tooth. These elongate cutting blades pass close by the shear bar 15, and effectively interact therewith in cutting up clods, roots and the like. Although we are not to be so limited, we prefer to use a rotor drum member 13a made of seamless steel pipe approximately 8 ⅝ inches in diameter, with a shaft 74, typically 2 inches in diameter, secured to each end of the rotor drum. It is about these shafts 74 that the rotor rotates.

The blade bases are preferably of steel, made from angle bar of ½ inch wall thickness, in which each leg of the angle bar measures 4 inches long. Each blade base may be regarded as being a 5 ½ inches length of angle bar, but before a blade base may be welded to the exterior of the drum, its lowermost portion is contoured to conform to the curvature of the drum when the forwardmost or apex portion of the blade base is preferably swept back at an angle of approximately 12°.

Rather than welding the blade bases BB in aligned arrays across the exterior of the rotor drum, we prefer to dispose them in helical arrays so that the cutting blade portions CB will not be in alignment.

A typical arrangement involves placing three evenly spaced blade bases on each of a number of circles drawn 8 ½ inches apart down the length of the rotor, or in other words, the blade bases of each circle are spaced 120° apart. The blade base offset between adjacent circles is approximately the dimension of one blade base, or in other words, the location of the rear edges of a given blade base on one circle defines the location of the apex of the nearest blade base of the next adjacent circle. In that way, it may be seen that three interlaced helixes are defined along the length of the rotor, with each helix containing approximately 11 teeth, thus amounting to 33 teeth on a rotor used in a framework measuring eight feet from right to left. Because the elongate cutting blades CB thus pass by the shear bar at differing times, a saving of horsepower is effected, and vibration is minimized. These and other facets of this part of our invention will be discussed at greater length hereinafter.

Continuing with a consideration of FIG. 7, it will be seen how power is supplied to the gear box 42 by means of shaft 40 connected to the power take-off of the tractor, with the power thereafter being carried outwardly by the rotatable shafts 46 and 48, through the torque limiters 52 and 54, respectively. Power is thus supplied to the upper chain sprockets located in essentially identical chain housings 56 and 58.

Although per se the torque limiters 52 and 54 are not regarded as inventive, it nevertheless should be pointed out that these devices serve to enable an inequality in the tightness of the drive chains to be quickly resolved, for a controlled amount of slippage can take place in either of these devices from time to time as required. The torque limiter 54 has been sectioned as it appears in FIG. 7, thus to reveal that the shaft 48 is connected to drive the outer housing portion 54a of the torque limiter 54 in rotation. This outer housing portion carries a pair of clutch facings 57, between which is located a driven plate or clutch disk 55 that is secured to shaft 64. A series of bolts 53 spaced about the periphery of the outer housing enable respective springs to be tightened so as to control the force with which the friction facings 57 grip the plate or disk 55, and thus establish how much torque will be transmitted before slippage occurs.

The torque limiters are additionally important in that they serve to prevent damage should the tiller rotor suddenly become jammed or locked, such as may occur if it encounters a large piece of buried scrap iron or the like. In such an instance, both torque limiters slip, for they are adjusted such that each transmit one-half of the available power. Also, if a component such as a drive chain fails, the torque limiter on the other side of the machine functions to prevent damage by not transmitting the full torque to the one-piece rotor 13.

Chain housing 58, appearing on the right hand side of the device in FIG. 1, but on the left as portrayed in FIG. 7, has been sectionalized in latter figure to reveal upper sprocket 62 that is arranged to receive a considerable amount of power from the tractor via the clutch arrangement of the torque limiter 54. The sprocket 62 is mounted on a shaft 64 that is supported by an outer bearing 66, preferably a ball bearing, and an inner bearing 68, also preferably a ball bearing. Chain 70, preferably a double chain as shown in FIG. 7a, is operatively disposed over the sprocket 62, with the lower portion of this chain extending around lower sprocket 72. The lower sprocket is operatively mounted upon one of the shafts 74 of rotor 13, with the inner end of shaft 74 being supported in a two row tapered, self-aligning roller bearing 78. The outer end of shaft 74 is supported by a single row bearing 76. The reason for the double bearing arrangement, involving the bearings 66 and 68 utilized with the shaft 64, and the bearings 76 and 78 utilized with the shaft 74, is that the chain 70 is arranged to transmit a considerable amount of power to the contra rotating tiller rotor 13, and if a double bearing arrangement was not used, the shafts would tend to bend, undergo considerable flexure, and then break in an untimely manner. The outer races of bearing 66 and 68 are mounted in a vertically slidable member 84, to permit the chains for the chain housing 58 to be tightened as may be necessary from time to time, as will be hereinafter discussed. Like relationships also exist with regard to left hand chain housing 56.

With reference to the right hand end of the rotor 13, which is on the left as viewed in FIG. 7, it is preferable that it be provided with an encircling sleeve 79 that serves to protect the bearings and seals, as well as the axle 74 from wrappage resulting from encounters with vines, roots, and the like. The sleeve 79 is of such a length such as to extend into the oval cutout 35 illustrated in FIG. 6, with this arrangement serving to prevent breakage of shaft 74. The sleeve hitting the rear end of the cutout 35 of course defines the rearmost extent of travel of the rotor 13 that is possible with respect to the framework 12. An identical sleeve and an oval cutout arrangement is of course utilized at the left end of the device also.

Reference to FIG. 7b reveals to a larger scale, the details of the relationship of the bearing 78 to the sleeve 79. On this figure, the bearing 78 is shown to reside in a bearing housing 80 that is bolted to a mounting plate 81, that is in turn bolted to the lower portion of the chain housing 58.

The rotor drum 13a is preferably made of a seamless steel pipe $8\frac{5}{8}$ inches in diameter, as previously mentioned, in each end of which is welded a circular steel plate 13b of heavy construction, as shown in dashed lines. The plate is typically of 1 inch thickness. A center hole is provided in each such bearing end plate 13b, and into these holes the shafts 74 forming the left and right ends of the rotor are inserted and then welded. Although each shaft 74 is welded to its respective end plate at both interior and exterior locations, it is preferred to place a hub 82 around the base of each shaft in order to lend additional strength.

As to constructional details, after a shaft 74 has been securely welded to its respective end plate, a hub 82 is heated and then forced along the length of the shaft, to the base portion of the shaft. Thereafter, the hub is quenched, thus to bring about a shrink fit. The hub is thereafter welded about its periphery to the end plate 13b of the rotor, with the $8\frac{5}{8}$ inch circular end plate then being secured in the end of the steel pipe constituting the rotor drum. We prefer to cut a $\frac{1}{4}$ inch step around the circumference of each end plate 13b, so that each end plate can be carefully interfitted into an end of the rotor drum before being welded in place.

In order to keep dirt and other foreign objects out of the bearing 78 and the chain housing, we prefer to use a pair of circular seals 83 in the end of the bearing housing 80. These seals are spaced apart, and have an inside diameter such as to fit closely around the exterior of the hub 82. To further inhibit the entry of dirt and the like, we utilize a heavy grease in the space between the seals, with this serving the additional purpose of preventing the loss of lubricating oil from the chain housing. The replenishment of the grease between the seals is accomplished by utilizing a hub that has been predrilled to provide interconnected radially-disposed and axially-disposed holes. The axially disposed hole is aligned with a similar hole disposed in the end plate of the rotor at the time of assembly with an appropriate radially disposed passage being provided along the interior of the end plate. By the provision of a grease fitting on an exterior portion of the rotor drum, grease can be forced along the above-described passages and thence into the space between the seals when such is necessary.

If the power take-off from the tractor is arranged to supply power to say 1000 rpm, we prefer to use a 3.11 to 1 gearbox, with the input or upper sprocket having 12 teeth and the output or lower sprocket having 18 teeth. These arrangements are utilized so that the rotor 13 can be operated in the preferred speed range of 200 to 210 rpm.

Because each chain, such as chain 70 shown in FIG. 7 (and FIG. 7a) tends to elongate in use, we preferably utilize a chain tightening arrangement that involves the raising of the aforementioned relatively movable member 84, upon which the supports for the outer races of bearings 66 and 68 are mounted. Bolts 86 and 88 are threadedly disposed in the upper portion of member 84, with the lower ends of these bolts bearing against the upper portion of the chain housing 58. When chain tightening is necessary, the bolts 86 and 88 are tightened, with this forcing the member 84 upward, lifting the bearings 66 and 68, with this in turn necessarily causing the upper shaft 64 to be raised with respect to the lower shaft 74, and this having the effect of separating the sprockets and therefore of tightening the chain. Appropriate slots in members 58 and 84 permit the motion just described.

Despite the double bearing arrangement utilized in conjunction with each of the shafts 64 and 74, it is always possible that some eccentricity may arise in the shafts. For example, when a large amount of power is being applied to the tiller rotor 13, the rotor may bow a bit, this having the result of causing some deflection in each stub shaft 74. To prevent this from causing such a shaft to bend and ultimately break, we preferably arrange for the chain housings 56 and 58 to "float," or in other words, for the upper portions of the housing to be able to move laterally to some extent during rotation of the rotor 13. Mounting of the chain boxes so that they can each maintain perpendicularity with their respective ends of the rotor is accomplished by the utilization of the aforementioned stub shafts 90 an 92 for supporting each chain housing. These shafts are each several inches long, with approximately the mid portions thereof being in contact with the outwardly extending members 142, 144, 146 and 148, as best seen in FIG. 8.

As a result of they type of support arrangement, the chain housings are free to tilt about the stub shafts, in that the upper portions of housings 56 and 58 are free to move toward and away from each other during rotation of the rotor 13, as dictated by possible deflections of the shafts 74. Because of this possible motion of the upper portions of the chain housings, we preferably utilize spline type joints on each side of the gearbox 42, such as will permit some motion of shafts 46 and 48 in the lengthwise direction during the delivery of power along such shafts.

The support of the chain housings by the shafts 90 and 92 received in the outwardly directed members is also advantageous from another standpoint, namely, that the chain housings can move rearwardly with respect to the outwardly extending support members at such time as an obstruction is encountered by the rotor. The chain housings are normally caused to reside in approximately the position shown in FIG. 8 by the use of springs 59 discussed in conjunction with FIG. 10, but upon encountering an obstruction, the chain housings can move against the bias of the springs, toward the support members 142 and 144, and away from the members 146 and 148.

Figure 9:
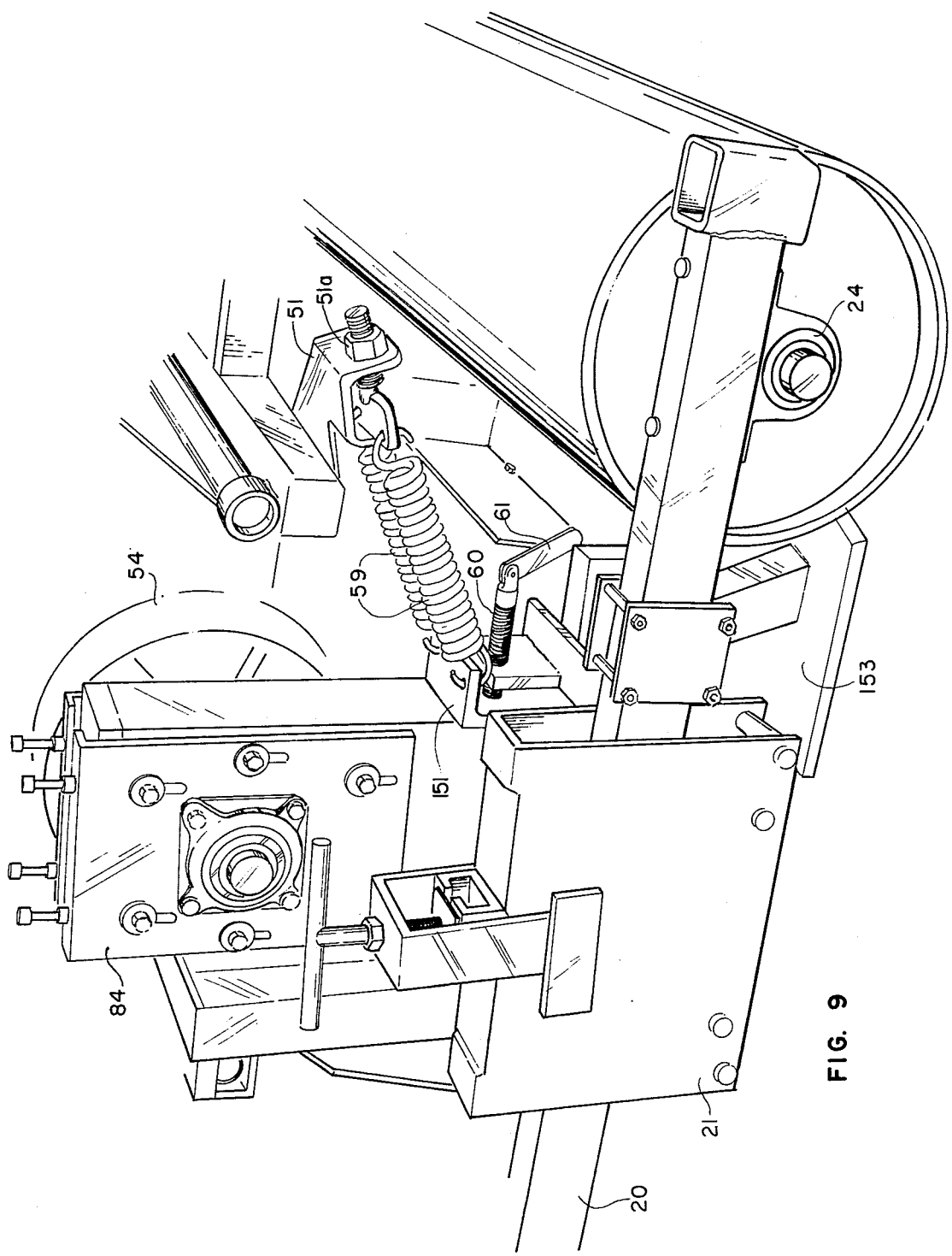
FIG. 9 is a perspective view of one end of our rotary tiller device, with this view being taken to a large scale in order to reveal the spring bias utilized in connection with each chain box for maintaining the cutting blades of the associated rotor spaced closely adjacent the shear bar and in effective cutting relationship therewith, with such bias able to be overcome upon a hard object being encountered.

Turning now to FIG. 9, it will be seen that this figure provides more information as to the manner in which the chain boxes are attached to the principal frame member 31.

Although as previously mentioned, the chain housings 56 and 58 are supported by means of the stub shaft 90 and 92, and the rotor 13 is carried by the chain housings, the chain housings are, on occasion, movable away from the normally forward position in which the cutter blades CB of the teeth clear the shear bar 15 only by a slight amount, such as ¼ inch. Such movement is made possible by the fact that one or more springs 59 are provided on each side of the machine in order to form a flexible interconnection between the framework 12 and the chain housings. These springs, in a manner of speaking, serve to "pull" the chain housings and rotor along behind the main frame, while in no way preventing the continuous flow of power from the power take-off of the tractor, through the torque limiters and chains of the chain housings, to the rotor 13.

As indicated in FIG. 9, we prefer to utilize a bolt 60 threaded into a pad 150 located on the member 146 on each side of the frame, with the bottom end of each of these bolts in contact with a chain housing 56 or 58. These bolts are carefully adjusted so as to provide minimum desired clearance between the cutting blade portions CB of the teeth, and the shear bar 15. The upper ends of the springs 59 are secured to members 51 adjacent the principal frame member 31, and the lower ends are secured to members 151 welded to the lower front portions of the chain housings. The springs are maintained under considerable tension, but because of the stop function served by the bolts 60, the teeth of the rotor cannot at any time hit the shear bar 15 and cause damage. Tension of the springs can be altered by rotating the nut 51a associated with the support member 51.

The arrangement involving the springs 59 is such as to permit motion of a chain box or housing in the rearward direction should the teeth of the rotor encounter a substantial obstruction, such as a stump, a piece of angle iron, or a large rock in the field being tilled. If such obstruction should be encountered, the rotor (and chain boxes) will, so to speak, drop back with respect to the principal frame member 31, which of course means that the space between the cutting edges CB of the teeth and the shear bar 15 will substantially increase. This means that if the scrap metal, rock, etc. has gotten between the shear bar and one or more rotor teeth, the dropping back of the rotor against the spring bias will serve to increase clearance, such that the obstruction may pass through the gap between the shear bar and the teeth. If the obstruction does not pass, slippage will occur in the clutches 52 and 54, thus to prevent damage.

Advantageously, we provide a handle 61 on the head of each bolt 60 on each side of the device so that the minimum spacing between shear bar and all cutting blade portions CB of the rotor can be established at whatever distance is appropriate for a given circumstance.

It should be noted that the relationship between the chain housings, spring bias means, and the rotor are such that each chain housing may drop back independently of the other, which of course means that an obstruction encountered on only one side will cause the springs 59 on that side to elongate, and the rotor to "pivot," in a manner of speaking, about the other chain housing. As soon as the obstruction has passed, the rotor is pulled back to the position in which its axis is parallel to the axes of the roller 14 and 16. The aforementioned support arrangement for the chain housings thus permits several different types of relative motion to take place with respect to the framework 12.

Turning now to FIG. 10, it will be seen that this figure is somewhat along the lines of FIG. 9, but differs in that part of the adapter plate 21 is broken away to reveal the cross axle 20 operatively mounted therein. As will be explained in detail, the weight of housing 12 and the components carried thereby is borne at the midportion of the cross axle 20 and 18. Related FIG. 11 has been sectionalized to reveal the components utilized at this midportion, and from this latter figure, it can be seen that a sleeve 140 resides upon the upper surface of the cross axle 20. This sleeve is welded at approximately the midportion of the cross axle 20, and through the sleeve, a sturdy bolt 156 extends. A skid pan 153 bolted below the cross axle 20 serves to protect the chain housing, and also to cuase the chain housing to pass more easily over rolled up vegetation. The significant details at only one end of the housing need be explained because of the substantial identicalness of the other end.

FIG. 11 reveals the stub shaft 92 mentioned in conjunction with FIG. 8, with the member 92 being disposed between the spaced horizontal members 146 and 148 extending outwardly from the end of the framework 12. The outer ends of members 146 and 148, as well as of members 142 and 144 are bolted to square tubing that is secured to the adapter plate 21. As will be noted, the adapter plate 21 has a significant thickness dimension such that the cross-axle 20 can be easily accommodted between the left and right sides of the adapter plate. Bolts 152 shown in FIG. 11 may be used in order to centrally locate tiller rotor 80 inside housing 12.

FIG. 11 illustrates the components utilized in conjunction with the adapter plate 21 and the cross axle 20 in order that the depth of cut of the tiller rotor 80 can be adjusted. It will be recalled that the large rollers 14 and 16 form the principal support for the tiller framework, with the cross axles 18 and 20 being able to tilt in their respective adapter plates relative to the framework 12. This motion of course takes place about the sleeve 140 and its counterpart in adapter plate 19, and in both instances, this can be considered as representing the location at which the weight of the housing is put upon the two cross axles. The horizontal members 142, 144, 146 and 148 establish a fixed relationship between the framework 12 and the adapter plates 19 and 21, which of course means that if the location where a cross axle resides in its adapter plate can be changed in the vertical sense, the depth of cut of the tiller rotor can be changed accordingly. To this end, we provide a yoke member 154 of steel strap that essentially surrounds the upper portion of each adapter plate. Various figures of drawing show the yoke 154 to have an essentially U-shaped cross section, with the large horizontally disposed bolt 156 threadedly engaging the inner portion of the yoke. It is in sleeve 140 that the bolt 156 is disposed, which of course means that the weight of the end of the housing 12 depicted in FIG. 11 may be regarded as being concentrated at the location of the sleeve 140 on the cross bar 20, with the inner and outer ends of the bolt 156 in turn transferring the support afforded by the cross axle 20 to the yoke member 154. A height adjustment screw 160 threadedly engages the upper portion of the yoke, but the lower portion of screw 160 is rotatably disposed in the upper portion of the adapter plate 21, which of course means that rotation of the height adjustment screw 160 by means of the handle 162 mounted at the upper portion thereof makes it possible for the height relationship between the yoke and the adapter plate to be selectively modified in a straightforward manner. Appropriate slots are provided in the adapter plate at the location of the bolt 156, so that height changes can freely take place between the yoke and the adapter plate.

As should now be apparent, as the handle 162 is turned clockwise as viewed from a location above FIGS. 10 and 11, this causes the upper central portion of the yoke member to move away from the upper portion of the adapter plate, which of course means that the bolt 156 moves up, thus permitting the cross axle 20 to move upwardly in the adapter plate. Inasmuch as it has already been pointed out that the cross axle 20 may be regarded as supporting the end of the framework 12 visible in FIGS. 10 and 11, as the cross axle seemingly moves up in the adapter plate, this in reality means that the adapter plate is moving downwardly, and this in turn means that the lateral bars 142, 144, 146 and 148 as well as the framework 12 supported thereby are allowed to lower with respect to the rollers 14 and 16. This of course means that the tiller rotor is thus permitted to take a cut of increased depth. Rotation of the handle 162 in the opposite direction quite clearly causes the rotor to engage the earth less deeply. The bolt 156 is provided with a handle 158, which enables this bolt to be tightened, with this bolt being loosened only when it is desired to rotate screw 160 to effect a height change.

Rear roller 16, shown in some detail in FIG. 12, is of course attached by means of appropriate bearings to the rear ends of cross axles 18 and 20, and thus serves to support the rear of our tiller device. However, this roller serves functions beyond mere support, for by compacting and leveling the surface of the soil, it reduces wind erosion, hastens the reduction of buried vegetation into humus, and aids the germination of seeds. Also, the rear roller serves to help provide a flat surface favorable to the planting of salad vegetables. Any soil tending to build up on the rear roller 16 is removed by the scraping action of bar 17, which is mounted on the rearmost portions of the cross axles such that it can move therewith at all times during the operation of our device.

FIG. 12 also reveals directly in front of the rear roller 16, the presence of a lower skirt 37, which skirt is coextensive with the rotor. This skirt is shown in further detail in FIG. 14. As shown in FIGS. 12 and 13, an upper skirt 36 is located immediately in front of, and higher than, the lower skirt 37.

Also visible in FIG. 12 are a pair of members 47, with each one of these members extending upwardly from a respective cross axle just forward of the rear roller. These members typically are made of channel iron, and are intended to serve as supports for the lower skirt 37. An elongate member 37b, that is longer than the main portion of the skirt, extends along the top of skirt 37, with the ends of member 37b extending equal distances beyond the main portion of the skirt, as best seen in FIG. 14. As is apparent from FIG. 12, the ends of the member 37b are received by the pair of members 47 in such a way that any tendency of the skirt to shift in a left or right direction is prevented. We place an aligned, spaced series of holes in each member 47, into which a respective supporting pin can be placed in any one of a number of selected positions. In that way we can establish the height of the lower skirt 37 to reflect soil conditions. For example, if the lower skirt is located too high, it will be unable to perform an adequate leveling function, whereas if the soil is sticky, the skirt must not be too low or else it will not let a sufficient flow of earth through the machine. In latter instance, a buildup of earth in the mixing chamber will result, with the consequence that an inordinate amount of power will be required.

As revealed by FIG. 13, both the upper and the lower skirts normally hang essentially vertically, but because they are hingedly mounted, they are free to swing for limited distances in the rearward direction. At such time as a considerable mass or conglomerate of fluidized earth is being mixed by the rotor 13, the skirts are caused to swing rearwardly, in the manner that was depicted in FIG. 4. A short length of chain may be used at each end of the lower skirt to prevent contact with the rear roller.

FIGS. 12 and 15 reveal that the upper skirt 36 is hingedly supported by means of members 45 located adjacent the upper rear member 38. The upper skirt 36 is coextensive with the rotor, and in effect forms the rear wall of the mixing chamber 43. It is dependently hinged for limited motion responsive to the rate of flow of the fluidized conglomerate through the mixing chamber.

The lower skirt 37 plays an important role in serving to level a field through which our device has been caused to pass. The counter-rotating rotor 13 frequently encounters roots, limbs, and various other items, and the terrain, for these and other reasons, may be quite uneven. However, because we use a number of sharpened blades on the rotor that are interacting with the shear bar 15, most encountered objects of a non-metallic nature will be pulverized or shredded so as to become part of the earth mixture that is being carried forward by the efforts of the rotor 13. Although as previously indicated, the roller 16 serves to bring about a smoothing and flattening function, the bottom surface 37a of the lower skirt 37 not only serves an important smoothing function, but also it tends to cause encountered holes, or holes created by the excising of roots and clods, to be quickly filled. This is because the two skirts cooperate with the rotor and other portions of our device to carry forward a conglomerate of fluidized earth, so each time a hole appears, it is a sense immediately filled by some of this fluidized mixture of earth and shredded vegetation. Thus, the lower edge 37a of the lower skirt is directly responsible in instances of this type in serving as a form of "grader," assuring that the surface is left much more level than it would otherwise have been.

Turning now to FIG. 16, it will there be seen that we have illustrated a complete rotor 13 of the mixing and chopping type that was briefly discussed in connection with FIG. 7. As will be noted from this figure, the toothed type blade units 100, 102 and 104 may be regarded as being in a first helical array, with blade units 106, 108, 110 and 112 being disposed in an adjacent helical array. It is further to be noted that blade units 114, 116, 118 and 120 are in an additional helical array. Thus, although we could use blade units in only a single helix, we prefer to dispose the blade units in three interlaced helical arrays. In the interests of conserving horsepower and creating as smooth an interaction with the shear bar as is possible, we dispose the toothed units in non-aligned longitudinal relationships, as previously mentioned, with this non-aligned relationship being exemplified by the placement to be noted with regard to blade units 102, 110 and 118. Because no two blade units are interacting with the shear bar at the same time, uneven power demands are avoided and vibration is minimized.

Turning to FIG. 17, we have there shown to a large scale, a typical tooth unit for use on a rotor in accordance with this invention. As previously mentioned, we typically create the blade base BB out of angle bar, having for example a wall thickness of ½ inch, with each leg of the angle bar being say 4 inches long. As viewed in FIG. 17, the blade base may be regarded as being a 5½ inch length of such angle bar, but with the cut edge of the angle bar destined to be welded to the rotor drum being contoured in such a way that it can interfit properly with the surface of the drum at the time of welding. As pointed out earlier, we typically do not dispose the blade bases exactly perpendicularly on the surface of the drum, but rather, we prefer to have the leading edge or apex of each blade base sweep back at an angle of say 12°. The upper end of each blade base is preferably cut off square, or in other words is perpendicular to the apex of the blade base, which of course means that when the blade cap or cutting blade CB is placed upon the blade base BB, the "heel" portion of the blade cap CB will be at a slightly smaller diameter than the cutting edge portion, which is desired. For example, the cutting edges of our toothed rotor can define a circle 19 inches in diameter, and the rear edges of members CB define a circle 18 inches in diameter. Quite obviously the edge of the blade portion CB nearest the apex of the blade base BB is sharpened, preferably in an undercut manner as shown in FIG. 17. The blade portions CB may be made from ½ inch steel plate ¾ inches long, and 3 inches wide.

As is obvious, large forces are built up in each blade unit of the toothed rotor during operation of our device in a field, so particular care must be taken to properly contour the bottom edges of the blade bases, and to thereafter weld such contoured edges of the blade bases to the surface of the rotor in a very careful manner. As is also obvious, a rugged means must be utilized for securing the cutting blades CB to the outermost ends of the blade bases BB.

As best revealed in FIG. 17, we secure mounting portions MP on the underside or inner portion of each cutting blade portion CB, each of which mounting portions is configured to properly interfit with the upper end of the respective blade base BB. Preferably these mounting portions are made from angle bar having 4 inch legs, although the wall thickness may be ¼ inch rather than the ½ inch wall thickness used for the blade bases. These mounting portions can be made from 2 inch lengths of such angle bar.

As apparent from FIG. 17, a hole 97 is provided in approximately the center of each face of each mounting means MP, which holes are in proper alignment with holes (not visible) placed in the upper portions of the faces of the blade bases. We prefer to countersink the hole 97 in the mounting portions so as to be able to properly receive the tapered heads of bolts 98 used to secure the cutting blade units CB to the blade bases BB. Preferably the underside of each bolt head is equipped with protrusions that interfit in slots utilized in the countersunk portions of the faces of the mounting portions. Because of this arrangement, when the bolts are placed in holes in the mounting means and blade bases that are properly aligned, and nuts are threaded on the ends of the bolts, the bolts will not tend to turn during the tightening of the nuts.

Optionally, we may use, as shown in FIG. 17, a cutting blade portion that is equipped with a protrusion or nose portion 99 welded at the forwardmost portion of each mounting portion MP. Such a nose portion on each tooth unit is most helpful when hard soils are being worked, for they act must like picks in serving to break up ths soil. These nose portions are typically 2 inches long, generally triangular, and made from steel plate ¾ inch thick.

Turning to FIG. 17a, the relationship of the protrusion or nose portion 99 to the other components of the tooth type blade unit will perhaps be made more clear. First it should be noted that the upper portion of the blade base BB is swept back with respect to a perpendicular through the drum, which fact was of course mentioned previously. As also mentioned before, inasmuch as the upper portion of the blade base is preferably cut off square, the upper portion of the blade base resides at an angle that reflects the sweep back of the blade base, and this in turn dictates that the heel portion of the blade cap is relieved for some ⅜ inch.

As depicted in FIG. 17a, we configure the nose portion 99 to have minimum friction while possessing maximum efficacy, with the minimum friction being obtained by relieving its upper edge with respect to the circle described by the cutting edge of the blade cap. Although we preferably cause the fowardmost portion of the protrusion 99 to reside on the maximum diameter circle, the base portion of the protrusion 99 is relieved say ¼ inch, or in other words, the cutting edge of the blade cap and the tip of nose 99 reside on a ¼ inch greater radius than the upper base portion of the protrusion 99. As previously mentioned, the use of the protrusion is optional, and is particularly advantageous for use in instances in which particularly hard ground is being worked with.

Turning now to FIG. 18, it will be seen that there we have illustrated a portion of one end of a typical toothed rotor in accordance with this invention, with blade bases of the described type having been secured thereon in a desired relationship. It has previously been mentioned that we preferably mount the blade bases on circles or bands disposed along the length of the rotor, which circles can for example be spaced every 8½ inches. Typically, three blade units are disposed on each circle, which of course means that the blade units of each circle are 120° apart. However, we deliberately place the blade units on each circle somewhat out of alignment with the blade units of adjacent circles. We prefer an arrangement in which the rearmost portion of one blade base is in alignment with the forwardmost portion of the nearest blade of the adjacent circle, and with the rear part of latter blade base in the same manner determining the location of the forwardmost portion of the nearest blade base of the subsequent circle, and so forth. This is depicted in FIG. 18, but we obviously are not to be limited to this arrangement.

As also revealed in FIG. 18, the cutting blade portions CB may form slight overlaps. If we use 8¾ inch long blade caps, approximately ¼ inch overlap occurs, as revealed in this figure. This is the arrangement desired when fine mulching is to be brought about. However, we are not to be limited to this, and either shorter or longer blade caps may be used. When fine mulching is not desired, the blade caps may be say 6½ inches long, which of course leaves approximately a 2 inch gap between the circles formed by adjacent blade tips. This arrangement will allow small chunks of earth to remain unbroken, as may be desired in some instances.

It should also be mentioned that the faces of the blade bases BB serve an important mixing funtion. This is because the spacing and relationship of tooth units is such that upon a given unit of soil being contacted by one blade face, that until of soil is destined to be contacted by at least one more blade face, but of course of a different tooth of the rotor as the machine continues through the field and the rotor continues its counter-rotation.

Figure 19:
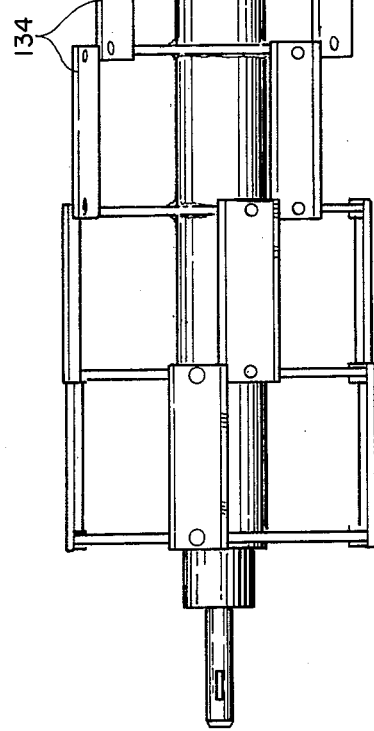
FIG. 19 is a showing of a gumbo rotor, which utilizes essentially flat blades, each forming a portion of the generally cylindrical outer surface of the rotor, with these blades being spaced in a staggered relationship.

Turning now to FIG. 19, we have there illustrated a completely different type of rotor, with this rotor being of a type that is particularly valuable for use in certain sticky soils known as gumbo. This rotor is generally cylindrical, with the outer surface thereof being principally made up of a plurality of generally rectangularly shaped blades 134 disposed in a spaced array, which is to say, with a considerable portion of the rotor's outer surface being left open. Each of the blades 134 has at least one long edge that has been sharpened, with the blade orientation being such that the principal surfaces of the blades each form a part of the exterior surface of the cylinder. It is further to be noted that the sharpened edges of the blades as well as the principal blade axes are essentially parallel to the axis of rotation of the rotor, with the direction of rotation of the rotor being arranged to bring the sharpened edges of the blades into contact with the ground.

At this point it is pertinent to contrast our gumbo rotor with the prior art type rotor that was equipped with a comparatively large number of L-shaped blades arrayed around its periphery. The nomanclature L-shaped was chosen because these blades were created to have a pair of legs intersecting at approximately a 90° angle, one leg radially disposed on the rotor, being bolted to a suitable mounting base thereon. The leg orthogonal to the radially disposed leg was caused to be essentially parallel with the longitudinal axis of the rotor, with the outer surface of the rotor thus being defined by a number of blades having a cantilevered portion.

Although those blades under ideal circumstances will perform a tilling function, they had two major disadvantages. The first disadvantage involved the fact that in heavy use, the blades became bent and distorted, with the cantilevered leg moving away from the right angle position with respect to the leg bolted to the rotor surface. Because this deformation was to be expected, users did not attempt to use that form of blade with a shear bar.

Secondly, in the event a rotor equipped with L-shaped blades is used in the field in which long grasses or vines had been growing, such rotor was prone to experience a considerable amount of wrappage, with this wrappage in effect serving to increase the diameter of the rotor drum. Since this did not at the same time increase the diameter of the blade circles, this had the effect of decreasing the effective projection of each blade, and markedly diminishing the effectivity of this type of rotor. As is obvious, it was frequently necessary for the user of this prior art type rotor to stop the machine, and then painstakingly cut away the vines and grasses.

Turning again to our gumbo type rotor, it will now be seen that this type of rotor possesses the advantages of the prior art rotor utilizing L-shaped blades, without possessing the disadvantages. Because each blade 134 of our gumbo rotor is supported at both ends, any substantial bending of the blade is almost impossible, particularly in view of the cross-sectional curvature possessed by each blade. As a result, the gumbo blade can without difficulty be easily and effectively used with a shear bar, with virtually no likelihood of an undesirable metal-to-metal contact taking place due to blade distortion. When our gumbo rotor is being used in a field containing vegetation, we typically adjust the rotor so that approximately ¼ inch spacing exists between the cutting edges of the rotor blades and the shear bar. On the other hand, when our gumbo rotor is being used in a field where no heavy vegetation is present, we typically increase the spacing of the cutting edges with respect to the shear bar.

Figure 20:
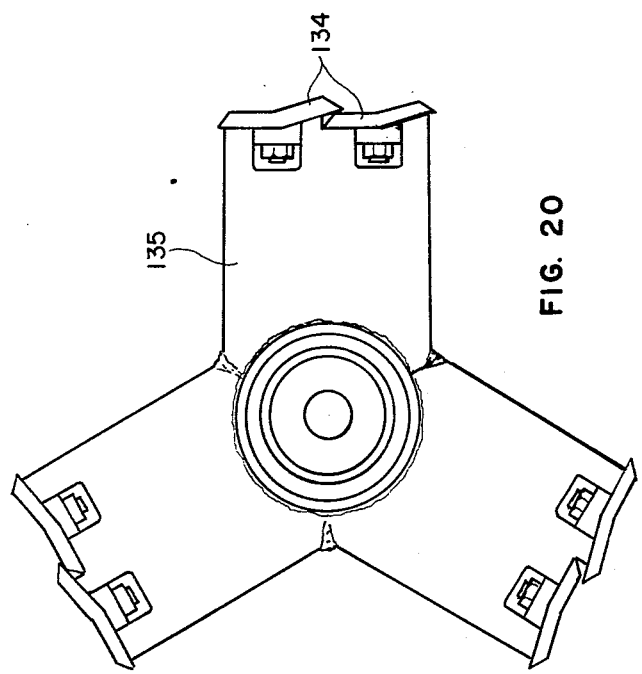
FIG. 20 is a side elevational view to a larger scale of one of the blade support units used along the length of the rotor of FIG. 19 to support the rectangular blades.

As to the other important advantage as to the gumbo blade over the prior art, because the blades, though staggered with respect to each other as shown in FIG. 19, nevertheless extend entirely from one end of the rotor to the other, wrappage of vines and long grasses around the interior or hub portion of the rotor is prevented. Because of the considerable amount of openness of the gumbo rotor, gumbo and other forms of earth obviously can substantially fill the interior of the rotor, but the interior of the rotor is, quite definitely, not subject to wrappage. Vines and long grasses can of course wrap around the exterior of the gumbo rotor, but these are promptly cut as soon as these build to such a point as to be intercepted by the shear bar. FIG. 20 is an end view revealing that the blade support arrangement may involve a number of three-legged blade support units 135, with the outer end of each being sufficiently wide as to be able to mount two blades 134. These three legs of the blade support unit 135 are of course spaced 120 degrees apart, as are the legs of all the other blade support units of this rotor, but each succeeding blade support unit of the rotor is rotationally displaced from the previous unit.

Figure 21:
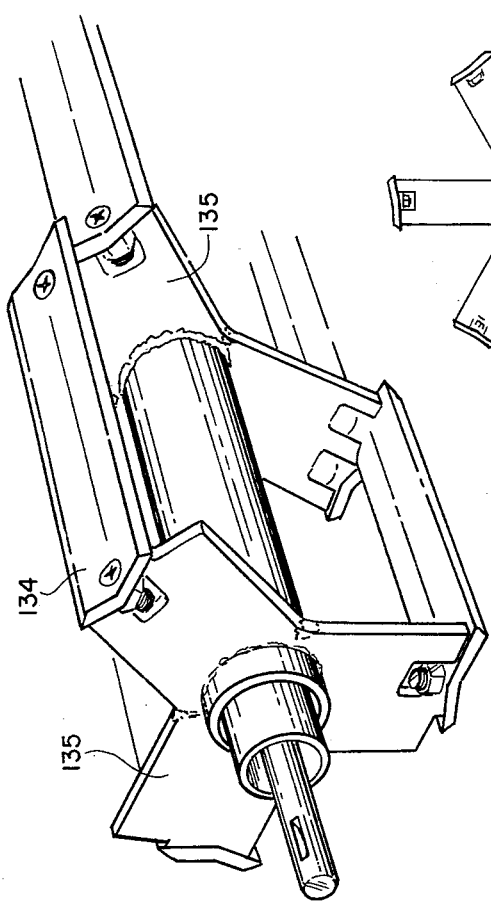
FIG. 21 is a fragmentary perspective view showing the manner in which the generally rectangular blades are supported in an alternating arrangement by adjacent blade support units.

Although FIG. 20 illustrates the fact that two blades are secured on the outer end of each leg, reference to FIG. 21 reveals that such adjacent blades are not coextensive, but rather extend in opposite directions. The arrangement is therefore such that the blades are in a staggered relationship along the length of the rotor, which is achieved not only by rotationally displacing each blade support unit with respect to the blade support unit on each side, but also by securing ends of two oppositely extending blades to each leg. As in the case of the toothed type rotor discussed in connection with FIGS. 16 through 18, we prefer to have the cutting edges of the blades 134 located on a slightly larger diameter circle than the other long edge of each blade, which of course is achieved by securing the blades in the manner revealed in FIG. 20.

Figure 22:
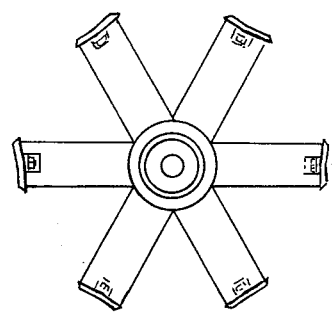
FIG. 22 is a view to a smaller scale of an alternate type of blade support unit.

We are not to be limited to three-legged blade support units, for quite obviously, six-legged blade support units may be utilized, as revealed in FIG. 22.

Although the blades used on the gumbo rotor could be flat rectangular members, we prefer for the blades 134 to be somewhat curved in cross-section as revealed in FIGS. 20 and 21, much in the nature of the corrugations used in certain metallic roofing material in order to increase strength and resistance to buckling. Further, both of the long edges of each blade may be sharpened at the time of manufacture, which of course means that upon the blades becoming dull, the bolts securing the blades to the blade mounting units may be loosened and each blade turned end for end so as to dispose the other sharpened edge such that it will encounter with the earth.

The gumbo type rotor illustrated in FIG. 19 and related figures is particularly good for breaking up the turf of sticky soil, for this type of rotor has minimum friction. This rotor will neither clog nor stick, but neither does it have the mixing qualities of the toothed type rotor previously discussed.

As should now be apparent from the foregoing discussions of the drawings, features and advantages of this invention, we have provided a tiller of highly advantageous construction for cutting and mulching vegetation, involving two different types of ground-engaging rotors that may be mounted for rotation on the framework equipped with rolling support means that enables the tiller to travel through a field or the like. Our tiller is of course equipped with a cooperative cover surrounding the upper portion of the rotor but spaced thereabove for a substantial distance so as to define a large mixing chamber.

The rotor is equipped with numerous blades that serve to forcefully engage the ground and being about a cross-mix of earth and vegetation into a fluidized conglomerate in the mixing chamber. We assure the desired flow of earth and prevent clogging by utilizing a deflector means closely adjacent the path of travel of the blade means, which deflector means is disposed above the lower edge of the forward wall of the mixing chamber. This novel deflector means is formed to intercept earth from the rotor blades that has been directed toward or parallel to the front wall, and serves to redirect such earth rearwardly over the rotor, with the earth thereafter flowing downwardly behind the rotor. In this way, the deflector means effectively prevents the clogging of the inside of the cover with earth and accordingly minimizes drag of earth on the rotor.

The fluidized earth flowing downwardly behind the rotor is of course available for filling small holes and for leveling the field through which the tiller has passed. Although the rolling support means following the rotor serves a leveling function, we can enhance the leveling function by utilizing at least one ground-engaging skirt following the rotor, which functions much in the nature of a road grader.

The framework of our tiller preferably includes a shear bar that is placed with respect to the blades of the rotor as to interact therewith, thereby making it possible for the rotor blades to cut roots and clods into very small pieces. The position of the rotor with respect to the framework is adjustable in at least two different respects, for the rotor may be selectively moved to adjust the spacing between the blades and the shear bar, and it can be additionally adjusted so as to control the depth at which the blades of the rotor engage the ground. Also, and as an alternative, we can adjust the rotor cutting depth by adjustment of the relationship of the rolling support means to the framework of the machine.

Our rotor is supported in an advantageous manner with respect to the framework to minimize breakage, with this support including spring bias means at each end of the rotor mounting means, serving to bias the blades toward the shear bar. Stop means cooperate with the spring bias means to maintain minimal separation between the shear bar and said blades, with the arrangement being such that the bias means can be at least partially overcome in the event a hard obstruction wedges between the shear bar and said blades. Such overcoming of the bias means permits an increase in the shear bar-blade spacing such that the obstruction may pass through.

As to specific rotor design, the rotor we utilize in the event a field has a considerable amount of roots and heavy brush is the toothed type rotor, having numerous blade bases, on each of which a cutting blade is located. These cutting blades are preferably arranged in one form or another of a helical configuration down the length of the rotor, with each cutting blade being in substantial parallelism with the shear bar at the time of its closest approach to the shear bar. The toothed type blade not only will cut up encountered roots and other vegetation into a form that can blend with the earth, but also the blade bases have faces configured to bring about a thorough mixing action with the earth as well.

We have found that our gumbo blade, utilizing a number of substantially rectangular shaped blades in staggered formation around the surface of the rotor to be particularly good for use in fields having very sticky soil, and although this rotor will not perform quite as good a mixing function as our toothed rotor, it is almost impossible for our gumbo rotor to become disabled, even in the very stickiest of soils.

We claim:

1. A tiller for cutting and mulching vegetation, comprising a framework, an elongate, ground-engaging rotor mounted for rotation with respect to said framework, and a cooperative cover essentially surrounding the upper portion of said rotor but spaced above said rotor for a substantial distance to define the upper boundaries of a large mixing chamber, said mixing chamber also having forward and rear walls, said framework having rolling support means, means for driving said rotor in a rotative direction opposite to that of said rolling support means, said rotor having a plurality of blade means that serve to forcefully engage the ground and bring about a cross-mix of earth and vegetation into a fluidized conglomerate in said mixing chamber, deflector means closely adjacent the path of travel of said blade means, and disposed above the lower edge of the forward wall of said mixing chamber, said deflector means extending in a longitudinal direction for essentially the length of said rotor, and extending along the arc of travel of said blade means for several inches, being disposed within approximately one inch of the path of travel of said blade means, said deflector means serving to intercept earth thrown off from said rotor blades and directed toward or parallel to said forward wall, and functioning to redirect such earth rearwardly over said rotor.

2. The tiller as defined in claim 1 in which leveling means are utilized for leveling the earth falling on the ground behind said rotor, said leveling means including skirt member hingedly disposed behind the rotor and adjacent thereto, with the lowermost edge of said skirt being in direct contact with the tilled earth.

3. The tiller as defined in claim 1 in which said rear wall of said mixing chamber is dependently hinged for limited motion responsive to the rate of flow of said fluidized conglomerate through said mixing chamber.

4. The tiller as defined in claim 1 in which said rotor has a multiplicity of cutting blades, and said framework has a fixed shear bar arranged to interact with peripheral portions of said cutting blades, thus to enable a cutting of heavy vegetation.

5. The tiller as defined in claim 4 in which the position of said rotor can be adjusted with respect to said framework, such adjustment including the establishment of a desired spacing between the peripheral portions of said cutting blades, and said shear bar.

6. The tiller as defined in claim 1 in which said blade means are disposed in a helical array around said rotor.

7. The tiller as defined in claim 1 in which said blade means are disposed in three separate but interlaced helical arrays around said rotor.

8. The tiller as defined in claim 7 in which a majority of said blade means involve two separate components, blade bases secured along a central portion of said rotor, and cutting means removably secured to said bases.

9. The tiller as defined in claim 1 in which said rotor is readily adjustable with respect to said framework in a depthwise attitude.

10. A tiller as defined in claim 1 in which said rotor is generally cylindrical, with the outer surface thereof being principally made up of a plurality of generally rectangularly shaped blades disposed in a spaced array, each of such blades having at least one long edge that has been sharpened, said blades being oriented such that principal surfaces thereof each form a part of the exterior of the cylinder, and such that their sharpened edges as well as their principal axes are essentially parallel to the axis of rotation of said rotor, the rotary direction of said rotor being such as to bring the sharpened edges of said blades into contact with the ground.

11. A tiller for cutting and mulching vegetation, comprising a framework, an elongate, ground-engaging rotor mounted for rotation with respect to said framework, and a cooperative cover essentially surrounding the upper portion of said rotor but spaced above said rotor for a substantial distance to define the upper boundaries of a large mixing chamber, said mixing chamber also having forward and rear walls, said framework having rolling support means, means for driving said rotor in a rotative direction opposite to that of said rolling support means, said rotor having a plurality of blade means that serve to forcefully engage the ground and bring about a cross-mix of earth and vegetation into a fluidized conglomerate in said mixing chamber, said blade means involving a multiplicity of cutting blades, said framework having a fixed shear bar arranged to interact with peripheral portions of said cutting blades, thus to enable a cutting of heavy vegetation, deflector means disposed closely adjacent the path of travel of said blade means, and disposed above the lower edge of the forward wall of said mixing chamber, said deflector means serving to intercept earth thrown off from said rotor blades and directed toward or parallel to said forward wall, and functioning to redirect such earth rearwardly over said rotor, and spring bias means for biasing said rotor in such a way that its blades normally operate in close proximity to said shear bar, though not in metallic contact therewith, such bias means being at least partially overcome in the event a hard obstruction wedges between said shear bar and said blades, thus allowing an increase in the shear bar-blade spacing, such that the obstruction may pass through.

12. A tiller for cutting and mulching vegetation comprising a framework, an elongate, ground-engaging rotor mounted for rotation with respect to said framework, and a cooperative cover essentially surrounding the upper portion of said rotor but spaced above the rotor for a substantial distance to define a large mixing chamber, said tiller having rolling support means, means for driving said rotor in a rotative direction opposite to that of said rolling support means, said rotor having a plurality of blade means that serve to forcefully engage the ground and bring about a cross-mix of earth and vegetation into a fluidized conglomerate in said mixing chamber, with the action of said rotor causing the fluidized mixture of earth and vegetation to flow over said rotor and thence downwardly behind said rotor, upper and lower hinged skirts, said upper skirt forming at least a portion of the rear wall of said mixing chamber, with the position of said upper skirt being responsive to at least some degree to the rate of flow of the fluidized conglomerate flowing through said mixing chamber, said lower skirt having a lower edge generally in contact with the tilled earth, and arranged to level the fluidized mixture after it has been deposited on the ground, and means for accomplishing a ready adjustment of the position of said rotor with respect to said framework.

13. The tiller as defined in claim 12 in which said rotor has a multiplicity of cutting blades, and said framework has a fixed shear bar arranged to interact with peripheral portions of said cutting blades, to enable a cutting of heavy vegetation.

14. The tiller as defined in claim 13 in which said means for accomplishing an adjustment of rotor position involves establishment of a desired spacing between the peripheral portions of said cutting blades, and said shear bar.

15. The tiller as defined in claim 12 in which said blade means are disposed in a helical array around said rotor.

16. The tiller as defined in claim 12 in which said blade means are disposed in three separate but interlaced helical arrays around said rotor.

17. The tiller as defined in claim 12 in which a majority of said blade means each comprise a blade base secured along an axial portion of said rotor, and cutting means removably secured to said base.

18. The tiller as defined in claim 12 in which said rotor is vertically adjustable with respect to said rolling support means.

19. A tiller as defined in claim 12 in which said rotor is generally cylindrical, with the outer surface thereof being principally made up of a plurality of generally rectangularly shaped blades disposed in a spaced array, each of such blades having at least one long edge that has been sharpened, said blades being oriented such that principal surfaces thereof each form a part of the exterior of the cylinder, and such that their sharpened edges as well as their principal axes are essentially parallel to the axis of rotation of said rotor, the rotary direction of said rotor being such as to bring the sharpened edges of said blades into contact with the ground.

20. The tiller as defined in claim 12 in which said mixing chamber has a forward wall, a lower portion of the inner surface of said forward wall of said mixing chamber being contoured, to deflect rearwardly, displaced material thrown essentially vertically by said rotor.

21. A tiller for cutting and mulching vegetation comprising a framework, an elongate, ground-engaging rotor mounted for rotation with respect to said framework, and a cooperative cover essentially surrounding the upper portion of said rotor but spaced above the rotor for a substantial distance to define a large mixing chamber, said tiller having rolling support means, means for driving said rotor in a rotative direction opposite to that of said rolling support means, said rotor having a plurality of blade means that serve to forcefully engage the ground and bring about a cross-mix of earth and vegetation into a fluidized conglomerate in said mixing chamber, with the action of said rotor causing the fluidized mixture of earth and vegetation to flow over said rotor and thence downwardly behind said rotor, means for leveling the mixture after it has been deposited on the ground, means for accomplishing a ready adjustment of the position of said rotor with respect to said framework, said rotor having a multiplicity of cutting blades, and said framework having a fixed shear bar arranged to interact with peripheral portions of said cutting blades, to enable a cutting of heavy vegetation, spring bias means for biasing said rotor toward said shear bar so that its blades normally operate in close proximity to said shear bar, and stop means cooperative with said spring bias means to maintain minimal separation between said shear bar and said blades, such bias means being at least partially overcome in the event a hard obstruction wedges between said shear bar and said blades, thus allowing an increase in the shear bar-blade spacing, such that the obstruction may pass through.

22. A tiller for cutting and mulching vegetation comprising a framework, an elongate, ground-engaging rotor mounted for rotation with respect to said framework, and a cooperative cover essentially surrounding the upper portion of said rotor but spaced above the rotor for a substantial distance to define a large mixing chamber, said tiller having rolling support means, means for driving said rotor in a rotative direction opposite to that of said rolling support means, said rotor having a plurality of blade means that serve to forcefully engage the ground and bring about a cross-mix of earth and vegetation into a fluidized conglomerate in said mixing chamber, with the action of said rotor causing the fluidized mixture of earth and vegetation to flow over said rotor and thence downwardly behind said rotor, a shear bar located along a lower interior portion of a forward part of said mixing chamber, said rotor being supported by a pair of housings, one at each end of said rotor, each housing containing means for driving said rotor in rotation, spring bias means disposed between each housing, and a respective portion of said framework, said spring bias means functioning to normally bias said rotor such that cutting blade portions of its blade means normally operate in close proximity to said shear bar, such bias means able to be overcome so as to permit an enlargement of the spacing between said cutting blade portions and said shear bar in the event a hard obstruction is encountered, thus to let such obstruction pass through.

23. The tiller as defined in claim 22 in which said housings are separately movable to permit local enlargement of the cutting blade-shear bar spacing, in the event an obstruction close to one of said housings is encountered.

24. The tiller as defined in claim 22 in which adjustment means are provided to enable ready modification of the normal cutting blade-shear bar spacing.

25. The tiller as defined in claim 22 in which adjustment means associated with the support of said housings are provided, such that height modifications of said housings with respect to the ground can be readily brought about, thus to effect change in the depth of cut of said rotor.

26. The tiller as defined in claim 22 in which said rotor is a toothed rotor, principally constituted by a plurality of blade bases secured in a spaced array around the periphery of a rotor drum, and extending down the length of the drum, a removable cutting blade portion of substantial length secured upon each of said blade bases, each cutting blade portion being in non-aligned relationship with adjacent cutting blade portions, but each cutting blade portion being in substantial parallelism with said shear bar at the instant of closest approach to said shear bar.

27. The tiller as defined in claim 26 in which each cutting blade portion also has a forwardly extending nose portion.

28. A toothed rotor in a rotary tiller with a stationary shear bar, said rotor comprising an elongate, cylindrically shaped rotor drum having mounting means at each end, enabling it to be rotatably mounted in a framework of said tiller upon which said shear bar is supported, a plurality of blade bases equiangularly disposed around the circumference of said drum at each of a number of locations along the length of said drum, with the blade bases at any one of such locations being rotationally displaced with respect to the position of the blade bases at adjacent locations, means on each of said blade bases for attaching an elongate cutting blade portion, with said cutting blade portion in each instance being substantially parallel to the axis of rotation of said rotor, said stationary shear bar mounted closely adjacent said cutting blade portions, and spring bias means normally operating to bias said rotor such that its blade portions normally operate in close proximity to said shear bar, though not in metallic contact therewith, such bias means being at least partially overcome in the event a hard obstruction wedges between said shear bar and said blade portions, thus allowing an increase in the shear bar-blade spacing, such that the obstruction may pass through.

29. The toothed rotor as defined in claim 28 in which said blade bases are disposed in a helical array on said rotor drum.

30. The toothed rotor as defined in claim 28 in which said blade bases are disposed in three interlaced helical arrays.

31. The toothed rotor as defined in claim 28 in which a nose portion extends forwardly from each cutting blade portion.

32. A rotor in a tiller with shear bar means, said rotor being generally cylindrical, and having mounting means at each end, enabling it to be rotatably mounted in a framework of said tiller adjacent said shear bar means, the outer surface of said rotor being principally made up of a plurality of generally rectangularly shaped blades equiangularly disposed around the circumference of said rotor at each of a number of locations along the length of said rotor, with the blades at any one of such locations being rotationally displaced with respect to the positions of the blades at adjacent locations, each of such blades having at least one long edge that has been sharpened, said blades being oriented such that their principal surfaces each form part of the exterior of the cylinder, and such that their sharpened edges as well as their principal axes are essentially parallel to the axis of rotation of said rotor, the rotary direction of said rotor being such as to bring the sharpened edges of said blades into contact with the ground, means associated with said framework for supporting said shear bar means in such relationship to said rotor as to interact with the blades thereof without metallic contact therewith, and spring bias means for normally biasing said blades toward said shear bar means, with said bias means being at least partially overcome in the event a hard obstruction wedges between said blades and said shear bar means, thus allowing an increase in the shear bar-blade spacing, such that the obstruction may pass through.

* * * * *